(12) United States Patent
Fu et al.

(10) Patent No.: US 11,423,179 B2
(45) Date of Patent: Aug. 23, 2022

(54) INTEGRATED-CHIP-BASED DATA PROCESSING METHOD, COMPUTING DEVICE, AND STORAGE MEDIA

(71) Applicant: Alibaba Group Holding Limited, Grand Cayman (KY)

(72) Inventors: Yingfang Fu, Beijing (CN); Peng Xiao, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 515 days.

(21) Appl. No.: 16/363,815

(22) Filed: Mar. 25, 2019

(65) Prior Publication Data

US 2019/0377907 A1 Dec. 12, 2019

(30) Foreign Application Priority Data

Jun. 11, 2018 (CN) .......................... 201810596085.2

(51) Int. Cl.
*G06F 21/72* (2013.01)
*H04L 9/32* (2006.01)
(Continued)

(52) U.S. Cl.
CPC ............ *G06F 21/72* (2013.01); *G06F 21/602* (2013.01); *H04L 9/0897* (2013.01);
(Continued)

(58) Field of Classification Search
None
See application file for complete search history.

(56) References Cited

U.S. PATENT DOCUMENTS 6,704,871 B1 * 3/2004 Kaplan ................... G06F 21/72
713/192
6,708,273 B1 * 3/2004 Ober ........................ G06F 8/60
713/189

(Continued)

OTHER PUBLICATIONS

The PCT Search Report and Written Opinion dated Jun. 25, 2019 for PCT Application No. PCT/US19/23897, 8 pages.

*Primary Examiner* — Arezoo Sherkat
(74) *Attorney, Agent, or Firm* — Lee & Hayes, P.C.

(57) ABSTRACT

A data processing method based on an integrated chip is provided. The method includes providing computing information of a trusted computing chip to a high-speed encryption chip, and invoking the high-speed encryption chip to perform data encryption or trusted computing based on the computing information. As such, after these two types of chips are integrated, these two types of secure computing (the trusted computing and the data encryption) can share common computing information. Compared with using individual sets of computing information before integration, corresponding hardware and management costs are reduced. Moreover, the trusted computing chip is superior to the high-speed encryption chip in terms of functional integrity and reliability for data encryption functions. Storing the computing information by the trusted computing chip can improve the security of the data encryption. For trusted computing functions, the utilization of the computing power of the high-speed encryption chip is increased, and the computational efficiency of the trusted computing is improved.

19 Claims, 10 Drawing Sheets

(51) Int. Cl.
*G06F 21/60* (2013.01)
*H04L 9/08* (2006.01)

(52) U.S. Cl.
CPC ........ *H04L 9/3234* (2013.01); *H04L 2209/12* (2013.01); *H04L 2209/127* (2013.01)

(56) References Cited

U.S. PATENT DOCUMENTS

| | | | |
|---|---|---|---|
| 9,467,425 B2 | 10/2016 | Epp et al. | |
| 9,747,220 B2 | 8/2017 | Goss et al. | |
| 9,784,260 B2 | 10/2017 | Lee et al. | |
| 10,031,861 B2 | 7/2018 | Chhabra et al. | |
| 10,325,118 B2 | 6/2019 | Chhabra et al. | |
| 10,412,191 B1 * | 9/2019 | Brandwine | G06F 21/57 |
| 10,496,833 B2 | 12/2019 | Arasu et al. | |
| 10,516,533 B2 | 12/2019 | Mannan et al. | |
| 2005/0066168 A1 | 3/2005 | Walmsley | |
| 2005/0185790 A1 * | 8/2005 | Le Quere | G06F 21/72 380/28 |
| 2007/0143623 A1 | 6/2007 | Walmsley et al. | |
| 2014/0108786 A1 * | 4/2014 | Kreft | H04L 9/0643 713/156 |
| 2014/0136853 A1 * | 5/2014 | Fukuda | G06F 21/602 713/189 |
| 2015/0358294 A1 * | 12/2015 | Kancharla | H04L 63/06 713/164 |
| 2017/0098102 A1 * | 4/2017 | Coker | G06F 21/76 |
| 2017/0364685 A1 * | 12/2017 | Shah | G06F 21/53 |
| 2018/0089435 A1 * | 3/2018 | Zander | G06F 21/575 |
| 2018/0270068 A1 * | 9/2018 | Innis | G06F 21/64 |
| 2018/0337776 A1 * | 11/2018 | Miller | G06F 21/79 |
| 2019/0052617 A1 * | 2/2019 | Chen | H04L 9/3265 |
| 2019/0306134 A1 | 10/2019 | Shanbhogue et al. | |

\* cited by examiner

INTEGRATED-CHIP-BASED DATA PROCESSING METHOD, COMPUTING DEVICE, AND STORAGE MEDIA

CROSS REFERENCE TO RELATED PATENT APPLICATIONS

This application claims priority to Chinese Patent Application No. 201810596085.2, filed on 11 Jun. 2018, entitled "Integrated-Chip-Based Data Processing Method, Computing Device, and Storage Media," which is hereby incorporated by reference in its entirety.

TECHNICAL FIELD

The present disclosure relates to the technical field of data processing, and particularly to integrated-chip-based data processing methods, computing devices, and storage media.

BACKGROUND

Trusted Computing is a trusted computing platform that is supported by hardware security modules and is widely used in computing and communication systems to provide the security of the entire systems. A trusted computing chip is a security chip that provides integrity and authenticity for evidence, and is generally bound to a computing platform through a physical means.

Data Encryption converts a plaintext into a ciphertext through an encryption algorithm and an encryption key, and decryption restores the ciphertext into the plaintext through a decryption algorithm and a decryption key. A high-speed encryption chip is a high-performance basic cryptographic device, which is applicable to various types of cryptographic operations, satisfies requirements such as data signature/verification, encryption/decryption, etc., and is generally bound to a computing platform through a physical means.

Through studies, Applicants have found that functions supported by two types of chips (a trusted computing chip and a high-speed encryption chip) are required in order to ensure that the security of a platform and a system of a device carried by a service, the security of key sensitive data (such as keys, certificates, etc.) of the service, and computations of sensitive data, especially for computing security, computing power and storage capacity of key information, can be implemented. However, at present, trusted computing chips and high-speed encryption chips each have their own key systems, and hardware costs of key management and management costs are relatively high.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above problems, the present disclosure has been proposed to provide an integrated chip-based data processing method, and a computing device, a computer readable storage media to resolve the above problems or at least partially resolve the above problems.

In implementations, a data processing method based on an integrated chip is provided. The integrated chip includes a trusted computing chip and a high-speed encryption chip. The method includes providing computing information of the trusted computing chip to the high-speed encryption chip, the computing information including key information and cryptographic operation information associated with trusted computing and data encryption; and calling the high-speed encryption chip to perform the data encryption or the trusted computing based on the computing information.

In implementations, the trusted computing chip and the high-speed encryption chip perform data communications based on a circuit.

In implementations, the computing information includes a measurement key, and the trusted computing includes verifying an integrity of a target algorithm and/or a legitimacy of an execution object of the algorithm based on the measurement key.

In implementations, the measurement key includes a platform measurement key, and verifying the integrity of the target algorithm and/or the legitimacy of the execution object of the algorithm based on the measurement key includes verifying an integrity of an integrity measurement code and the legitimacy of the execution object of the algorithm based on the platform measurement key before performing an integrity measurement on a system or a platform.

In implementations, the measurement key includes a user measurement key, and verifying the integrity of the target algorithm and/or the legitimacy of the execution object of the algorithm based on the measurement key includes verifying an integrity of an operating algorithm of a user cryptographic operation is verified based on the user measurement key prior to performing the user cryptographic operation.

In implementations, the trusted computing chip is configured to perform at least one first cryptographic algorithm, and the method further includes selecting at least one first cryptographic algorithm that matches a current mode of the integrated chip.

In implementations, the trusted computing chip is configured to be securely stored with trusted computing system firmware, and the trusted computing includes using the trusted computing system firmware to schedule and execute trusted computing task(s) to perform integrity verification on a cryptographic operation.

In implementations, the computing information includes at least one master key for a user application key, the master key is securely stored on the trusted computing chip, and the master key is used for protecting the user application key;

Providing the computing information of the trusted computing chip to the high-speed encryption chip includes obtaining the master key by the high-speed encryption chip from the trusted computing chip, and the data encryption includes encrypting the user application key according to the obtained master key.

In implementations, the computing information includes high-speed encryption operation firmware, the high-speed encryption operation firmware is securely stored on the trusted computing chip, and the high-speed encryption operation firmware includes at least one second cryptographic algorithm.

Providing the computing information of the trusted computing chip to the high-speed encryption chip includes obtaining the second cryptographic algorithm from the trusted computing chip by the high-speed encryption chip, and the data encryption includes performing the data encryption using the at least one second cryptographic algorithm of the high-speed encryption operation firmware.

In implementations, the computing information includes a system secure operation firmware, and providing the computing information of the trusted computing chip to the high-speed encryption chip includes obtaining the system secure operation firmware from the trusted computing chip, and securely storing the system secure operation firmware on the high-speed encryption chip.

The trusted calculations include performing a secure operation of a system on the high-speed encryption chip.

In implementations, the computing information includes a user policy firmware, the user policy firmware being used for formulating cryptographic algorithm requirement(s) of an application, and providing the computing information of the trusted computing chip to the high-speed encryption chip includes obtaining the user policy firmware from the trusted computing chip and storing the user policy firmware on the high-speed encryption chip.

The method further includes reconstructing the user policy firmware on the high-speed encryption chip according to user requirement data.

In implementations, the computing information includes an operation key, the operation key being used for protecting user data, and providing the computing information of the trusted computing chip to the high-speed encryption chip includes obtaining the operation key from the trusted computing chip and storing the operation key on the high-speed encryption chip.

The data encryption or the trusted computing includes performing the data encryption or the trusted computing based on the operation key.

In implementations, the high-speed encryption chip stores user data, and the method further includes reconfiguring the user data on the high-speed encryption chip according to the user requirement data.

In implementations, the trusted computing a high-speed computing and a low-speed computing, and the trusted computing includes invoking the trusted computing chip to perform low-speed computing for platform security and/or system security; and/or, invoking the high-speed encryption chip to perform high-speed computing.

In implementations, the key information includes a platform certificate, a platform public key, a platform private key, a platform identity certificate, a platform identity public key, a platform identity private key, a storage key, a platform measurement key, a user measurement key, and a master key, and an operation key.

In implementations, the integrated chip includes a platform password storage structure, an authentication password storage structure, a storage password storage structure, and a measurement password storage structure, for storing the key information. The platform password storage structure includes a platform certificate, a platform public key, and a platform private key. The authentication password storage structure includes a platform identity certificate, a platform identity public key, and a platform identity private key. The storage password storage structure has a storage key. The measurement password storage structure includes a platform measurement key, and a user measurement key.

In implementations, the user measurement key is stored in a non-volatile storage space of the trusted computing chip, or a static storage area of the high-speed encryption chip. The master key is stored in a non-volatile storage space of the trusted computing chip, or a storage space external to the integrated chip after being encrypted by the storage key. The operation key is stored in a non-volatile storage space of the trusted computing chip, or a static storage area of the high-speed encryption chip, or a storage space outside the integrated chip after being encrypted by the master key.

Correspondingly, according to another aspect of the present disclosure, a computer apparatus is also provided, which includes a memory, a processor, and a computer program stored on the memory and operable on the processor. The processor, when executing the computer program, implements one or more of the methods described above.

Correspondingly, in accordance with another aspect of the present disclosure, a computer readable storage media is also provided, which has stored thereon a computer program that, when executed by a processor, implements one or more of the methods described above.

According to the embodiments of the present disclosure, by providing computing information of a trusted computing chip to a high-speed encryption chip, the high-speed encryption chip is invoked to perform data encryption or trusted computing based on the computing information. As such, after these two types of chips are integrated, these two types of secure computing (the trusted computing and the data encryption) can share unified computing information. Compared with using separate sets of computing information before integration, corresponding hardware and management costs are reduced. Moreover, the trusted computing chip is superior to the high-speed encryption chip in terms of functional integrity and reliability for data encryption functions. Storing the computing information by the trusted computing chip can improve the security of the data encryption. For trusted computing functions, the utilization of the computing power of the high-speed encryption chip is increased, and the computational efficiency of the trusted computing is improved.

Furthermore, since the trusted computing chip and the high-speed encryption chip perform data communications based on a circuit, data transmitted between the two chips belongs to internal transmission, and does not need to be performed by mapping memory of a host machine (Host), thereby improving the speed of data transmission.

Furthermore, by adding a measurement key, in a process of integrity measurement of a platform and a system, the security is ensured in the entire process of measurement due to a participation of the key.

Furthermore, a trusted computing chip is invoked to perform low-speed computing for platform security and/or system security, and/or a high-speed encryption chip is invoked to perform high-speed computing, providing an overall computational efficiency and computational security.

The above description is merely an overview of the technical solutions of the present disclosure, which is used for allowing the technical means of the present disclosure to be more clearly understood. Implementations can be performed in accordance with the content of the specification. In order to enable the above and other objects, features and advantages of the present disclosure to be understood more easily, specific exemplary implementations of the present disclosure are provided hereinafter.

BRIEF DESCRIPTION OF THE DRAWINGS

Various other advantages and benefits will become apparent to one skilled in the art by reading the detailed description of the exemplary implementations in the following description. The accompanying drawings are merely used for the purpose of illustrating the preferred embodiments and are not intended to be limitations to the present disclosure. Throughout the drawings, same reference numerals are used for representing same components. In the drawing.

DETAILED DESCRIPTION

Figure 1:
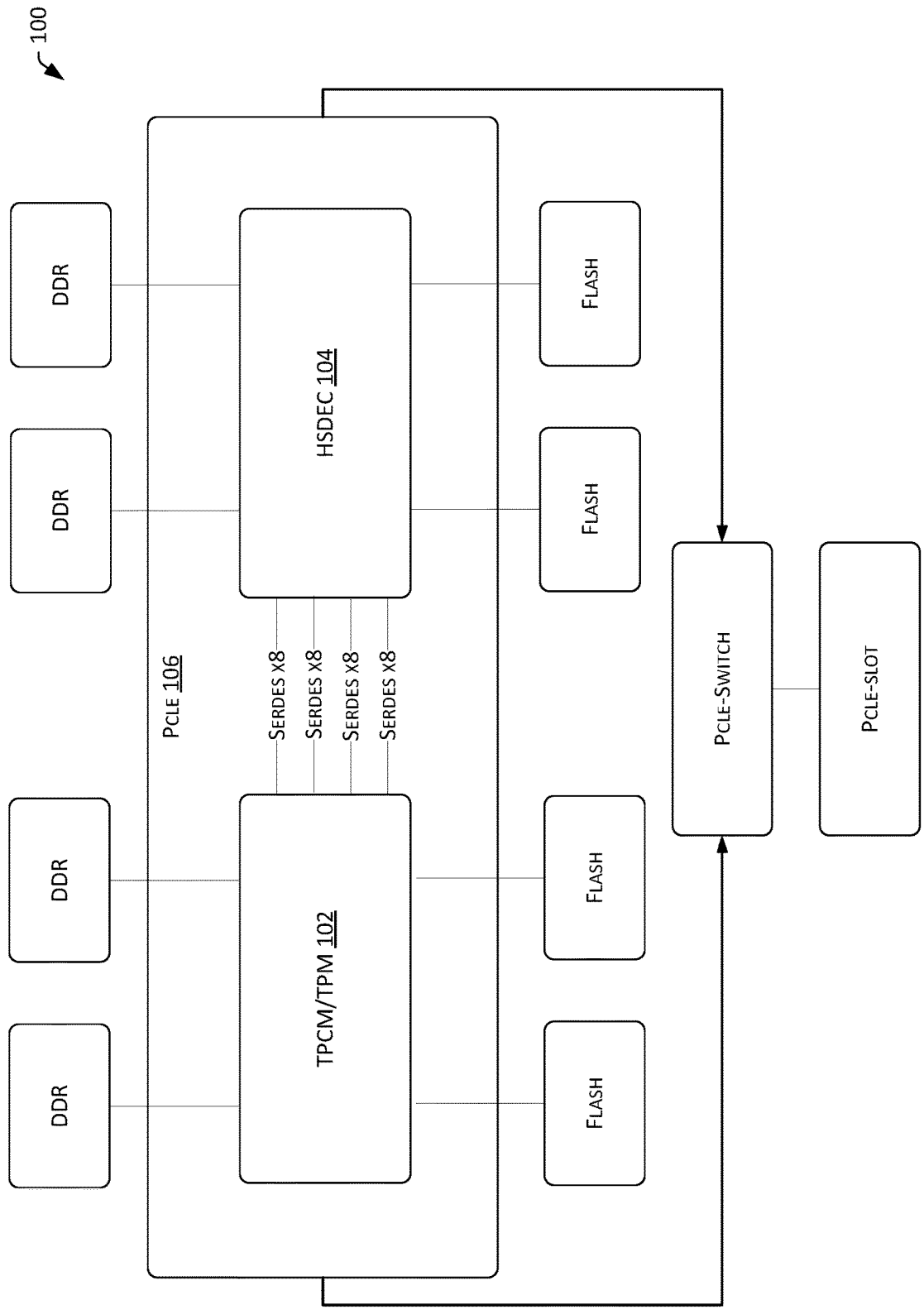
FIG. 1 shows a structural block diagram of a trusted high-speed data encryption card.

Exemplary embodiments of the present disclosure will be described in more detail hereinafter with reference to the accompanying drawings. Although the exemplary embodiments of the present disclosure are shown in the drawings, it should be understood that the present disclosure can be implemented in various forms, and is not limited by the embodiments described herein. Rather, these embodiments are provided so that the present disclosure will be understood more comprehensively, and the scope of the present disclosure can be completely conveyed to one skilled in the art.

To enable one skilled in the art to better understand the present disclosure, concepts involved in the present disclosure are described hereinafter.

An integrated chip includes a trusted computing chip and a high-speed encryption chip. In other words, a trusted computing chip and a high-speed encryption chip are integrated into an integrated chip to implement a platform trusted boot function (from a time of booting to a time before an operating system kernel is loaded), the computational security of encryption and decryption of service sensitive data, and interactions between two devices, and to guarantee the legitimacy of a platform and an identity of each other. Any specific ways of integration may be adopted, and the embodiments of the present disclosure do not have any limitations thereon.

After integration, a trusted computing chip part can perform not only trusted computing, but also data encryption. A high-speed encryption chip part can perform not only data encryption but also trusted computing. In general, trusted computing chips are superior to high-speed encryption chips in terms of functional integrity and reliability. Therefore, storing computing information on a trusted computing chip can improve security. High-speed encryption chips generally have a better computing power as compared to trusted computing chips, and can complete data encryption or trusted computing more quickly. Even if a high-speed encryption chip is not superior to a trusted computing chip, the efficiency of trusted computing can also be improved with an introduction of the computing power of the high-speed encryption chip.

Figure 2:
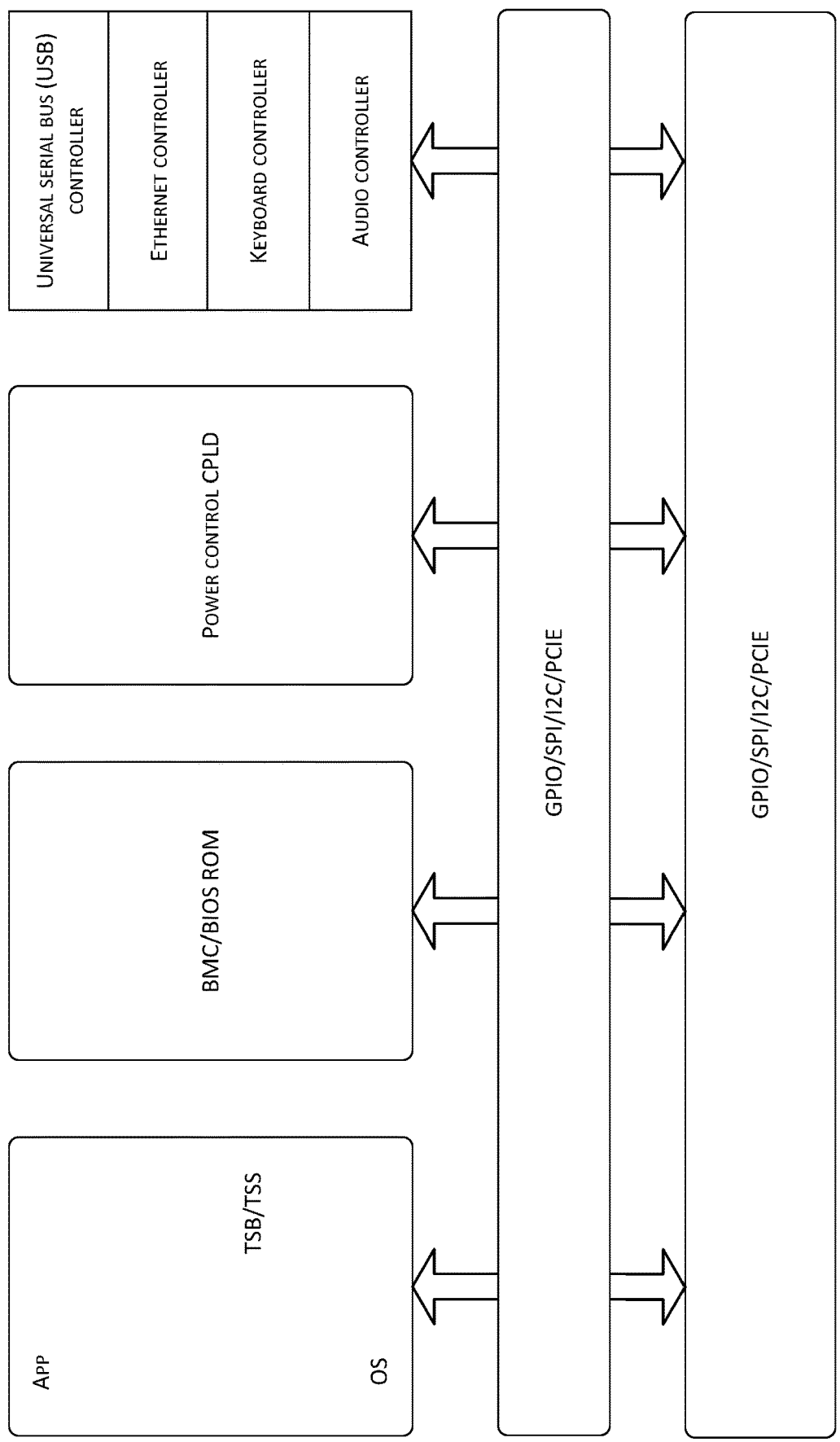
FIG. 2 shows a schematic diagram showing a relationship between a trusted high-speed data encryption card and a common component of a motherboard.

For example, FIG. 1 shows a structural block diagram of a Trusted High-Speed Data Encryption Card (THSDEC) 100, i.e., an integrated chip, which includes a Trusted Platform Computing Module/Trusted Platform Module, (TPCM/TPM) 102 and a High-Speed Data Encryption Card (HSDEC) 104. With reference to "GB/T 29827-2013 Information Security Technology—Trusted Computing Specification—Trusted Platform Motherboard Functional Interface" standard requirements, and TPCM/TPM Trusted chip designs, the trusted computing chip and the high-speed encryption card are integrated into a PCIe card 106. FIG. 2 shows a relationship between a trusted high-speed data encryption card THSDEC and common components of a motherboard. The trusted high-speed data encryption card THSDEC conducts command and data interactions with the trusted software-based TSB (or Trusted Software Stack TSS) via a PCIE or SPI bus, and a multiplexing is performed for GPIO/SPI/I2C using a multiplexer to implement BMC/BIOS measurements and connections to related controllers.

Both trusted computing and data encryption are secure computing, and both data encryption and trusted computing need to be performed based on computing information. The computing information includes key information and cryptographic operation information of trusted computing and data encryption. The key information includes keys involved in various types of cryptographic operations, for example, a measurement key, a master key, an operation key, etc., or any other applicable key information, which is not limited by the embodiments of the present disclosure. The cryptographic operation information includes algorithms, computing components, and data involved in various types of cryptographic operations, such as cryptographic algorithms, a trusted computing system firmware, high-speed encryption computing firmware, system secure operation firmware, user policy firmware, user data, etc., or any other applicable cryptographic operation information, which is not limited in the embodiments of the present disclosure.

In implementations, the trusted computing chip and the high-speed encryption chip perform data communications based on a circuit. For example, FIG. 1 shows a structural block diagram of a trusted high-speed data encryption card 100, which can directly conduct communications through a circuit inside a board, without the need of mapping into a memory of a host machine (Host), thereby improving the speed of data transmission.

In implementations, the computing information includes a measurement key. The measurement key is used for verifying the integrity of a target algorithm and/or the legitimacy of an execution object of the algorithm. In other words, the measurement key is used to ensure that measurements of a corresponding firmware are obtained using a hash obtained by a legitimate person. For example, a measurement object uses a HMAC (Hash-based Message Authentication Code) function to perform measurements. In a process of integrity measurement of a platform and a system, the trusted computing chip cannot guarantee the security in the entire measurement process because of a lack of key participation, i.e., inability to guarantee whether it is a legal licensor (i.e., an execution object of an algorithm) which performs a measurement using a designated measurement algorithm (i.e., a target algorithm). Therefore, the present disclosure adds a measurement key to guarantee the security throughout the entire measurement process. The target algorithm includes an integrity measurement code and a user cryptographic operation, or any other applicable algorithm, which is not limited by the embodiments of the present disclosure. The execution object of the algorithm includes a current user of the system or the platform, or any other applicable object that executes the algorithm, which is not limited by the embodiments of the present disclosure.

Figure 3:
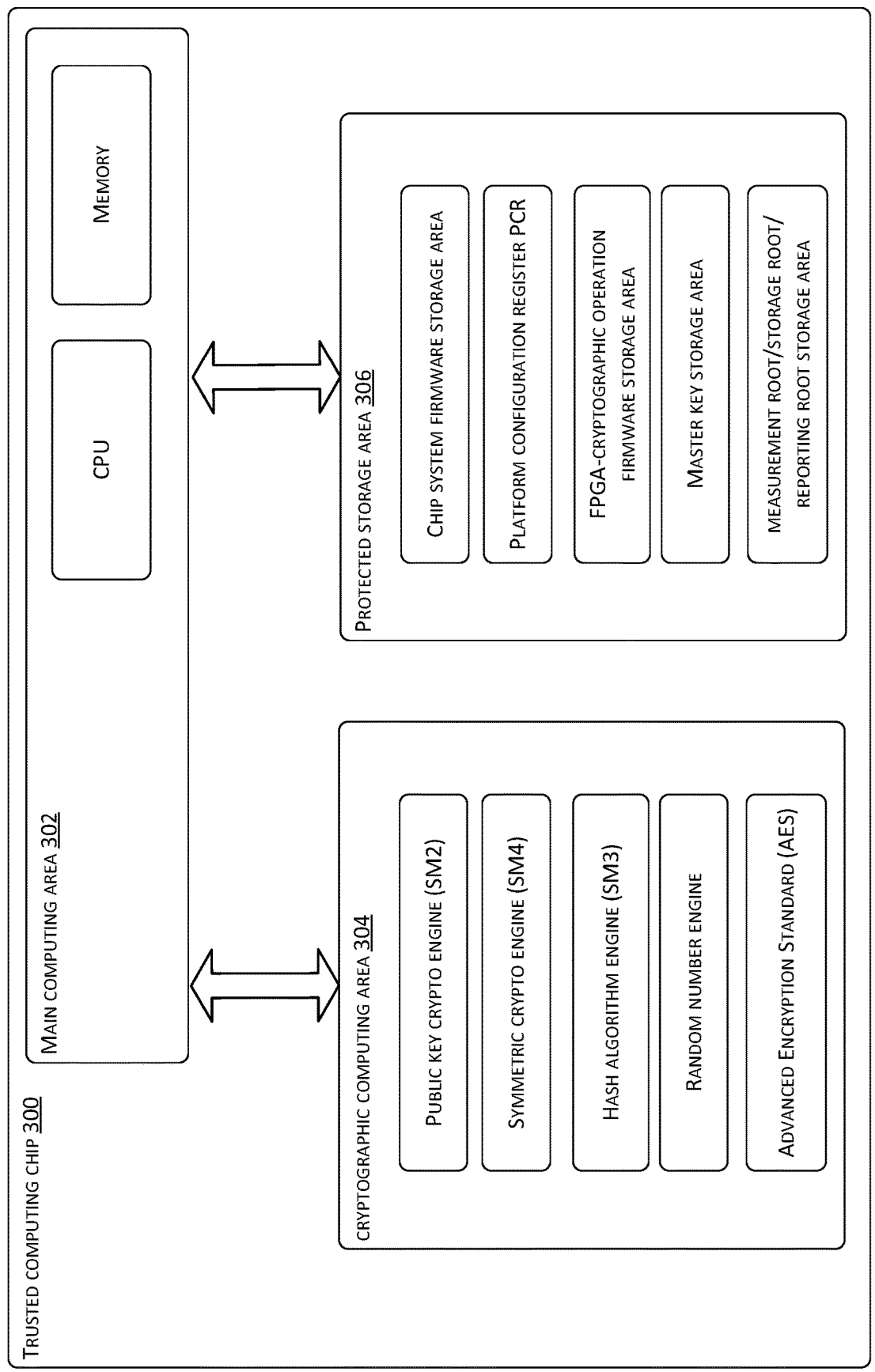
FIG. 3 shows a structural block diagram of a trusted computing chip.

For example, in a structural block diagram of a trusted computing chip 300 as shown in FIG. 3, the trusted computing chip 300 is mainly composed of a main computing area 302, a cryptographic computing area 304, and a storage area 306. The main computing area 302 includes a CPU and a memory, and is mainly responsible for general computing other than cryptographic operations that have relatively low requirements for cryptographic computing power and storage capacity but have high security requirements. The storage area includes a measurement root (i.e., a measurement key)/storage root/reporting root storage area, in which the measurement key is stored.

In implementations, the measurement key includes a platform measurement key, which is specifically used for verifying the integrity of an integrity measurement code and the legitimacy of an execution object of an algorithm before performing integrity measurement on the legitimacy of a system or a platform. The integrity measurement code is used for measuring the integrity of the system or the platform, and may include any applicable algorithm, which is not limited in the embodiments of the present disclosure.

In implementations, the measurement key includes a user measurement key, which is specifically used for verifying the integrity of an operation algorithm of a user cryptographic operation before performing the user cryptographic operation. The user cryptographic operation includes a related operation involving a user password, and may include any applicable operation, which is not limited in the embodiments of the present disclosure.

In implementations, the computing information includes at least one master key for a user application key. Specifically, the user application key may be encrypted using the master key to protect the user application key. The master key is securely stored on the trusted computing chip, which improves the storage security of the master key as compared to being stored on a high-speed encryption chip.

In implementations, the computing information includes an operation key. The operation key is used for protecting user data, especially user sensitive data. The operation key may be stored in a non-volatile storage space of the trusted computing chip, or may be stored in a static storage area of the high-speed encryption chip, or may be stored in a storage space other than an integrated chip after being encrypted by the master key. In order to perform trusted computing or data encryption on the high-speed encryption chip, the operation key can be obtained from the trusted computing chip, and then securely stored on the high-speed encryption chip, so that the high-speed encryption chip can perform data encryption or trusted computing.

In implementations, at least one first cryptographic algorithm is securely stored on the trusted computing chip. The first cryptographic algorithm includes different types of cryptographic algorithms, and is mainly responsible for cryptographic operations that have low cryptographic computing capability and storage functional requirements. Specifically, the first cryptographic algorithm may include any applicable algorithms, which are not limited in the embodiments of the present disclosure. The first cryptographic algorithm is generally securely stored, or may be customized in advance. Alternatively, different modes may be designed for the integrated chip, and each different mode is assigned with at least one algorithm, so that a first cryptographic algorithm is dynamically selected according to a mode when trusted computing or data encryption is performed.

For example, a cryptographic computing area of a trusted computing chip as shown in FIG. 3 includes engines of different types of cryptographic algorithms (i.e., first cryptographic operations), such as SM2 (a public key crypto engine), SM3 (a hash algorithm engine), SM4 (a symmetric crypto engine), RSA (a random number engine), AES (Advanced Encryption Algorithm engine), etc., which are mainly responsible for cryptographic operations with low cryptographic computing capability and storage capacity requirements.

In implementations, the key information includes a platform certificate, a platform public key, a platform private key, a platform identity certificate, a platform identity public key, a platform identity private key, a storage key, and a platform measurement key, a user measurement key, a master key, and an operation key.

The key information included in the trusted high-speed data encryption card THSDEC (i.e., the integrated chip) may be the one shown in Table 1:

| Name | Use | Storage Location | Method of Generation | Quantity |
| --- | --- | --- | --- | --- |
| A device platform public and private key pair (a device platform signing certificate) (i.e. a platform certificate, a platform public key, a platform private key) | Identify an identity of a trusted high-speed encryption card (i.e., an integrated chip), being used for verifying whether it is a legitimate chip of a manufacturer, and generating a platform identity public and private key pair corresponding to an application | Non-volatile storage space of a trusted computing chip | Generated by the manufacturer when the chip is shipped from the manufacturer | One pair |
| A device platform identity public and private key pair (a platform | Being used for verifying an identity and an integrity of an application platform | Non-volatile storage space of a trusted computing chip | Generated by an enterprise trusted management | Multiple pairs |

-continued

| Name | Use | Storage Location | Method of Generation | Quantity |
|---|---|---|---|---|
| identity certificate) (i.e., a platform identity certificate, a platform identity public key, and a platform identity private key) | | | and control platform center | |
| A storage root key (i.e., a storage key) | Protect a master key of a user | Non-volatile storage space of a trusted computing chip | Generated by an enterprise trusted management and control platform center | One pair |
| A platform measurement root key (i.e., a platform measurement key) | Determine legitimacy and integrity of a platform | Non-volatile storage space of a trusted computing chip | Generated by an enterprise trusted management and control platform center | One pair |
| A user computing measurement key (i.e., a user measurement key) | Determine the legitimacy and integrity of user cryptographic firmware | Non-volatile storage space of a trusted computing chip; a static storage area of a high-speed encryption chip | Generated by an enterprise trusted management and control platform center | Multiple symmetrical key pairs |
| A master key | Protect a user key | Non-volatile storage space of a trusted computing chip; or stored in a location other than the integrated chip after being encrypted using the storage root key | Generated by an enterprise trusted management and control platform center | Multiple pairs |
| A user key (i.e., an operation key) | Protect user sensitive data | Non-volatile storage space of a trusted computing chip; a static storage area of a high-speed encryption chip; or stored in a location other than the integrated chip after being encrypted using the master root key | Generated by an application user | Multiple pairs |

In implementations, the integrated chip includes a platform password storage structure, an authentication password storage structure, a storage password storage structure, and a measurement password storage structure, for storing the key information. The platform password storage structure includes a platform certificate, a platform public key, and a platform private key. The authentication password storage structure includes a platform identity certificate, a platform identity public key, and a platform identity private key. The storage password storage structure includes a storage key. The measurement password storage structure includes a platform measurement key and a user measurement key.

Figure 4:
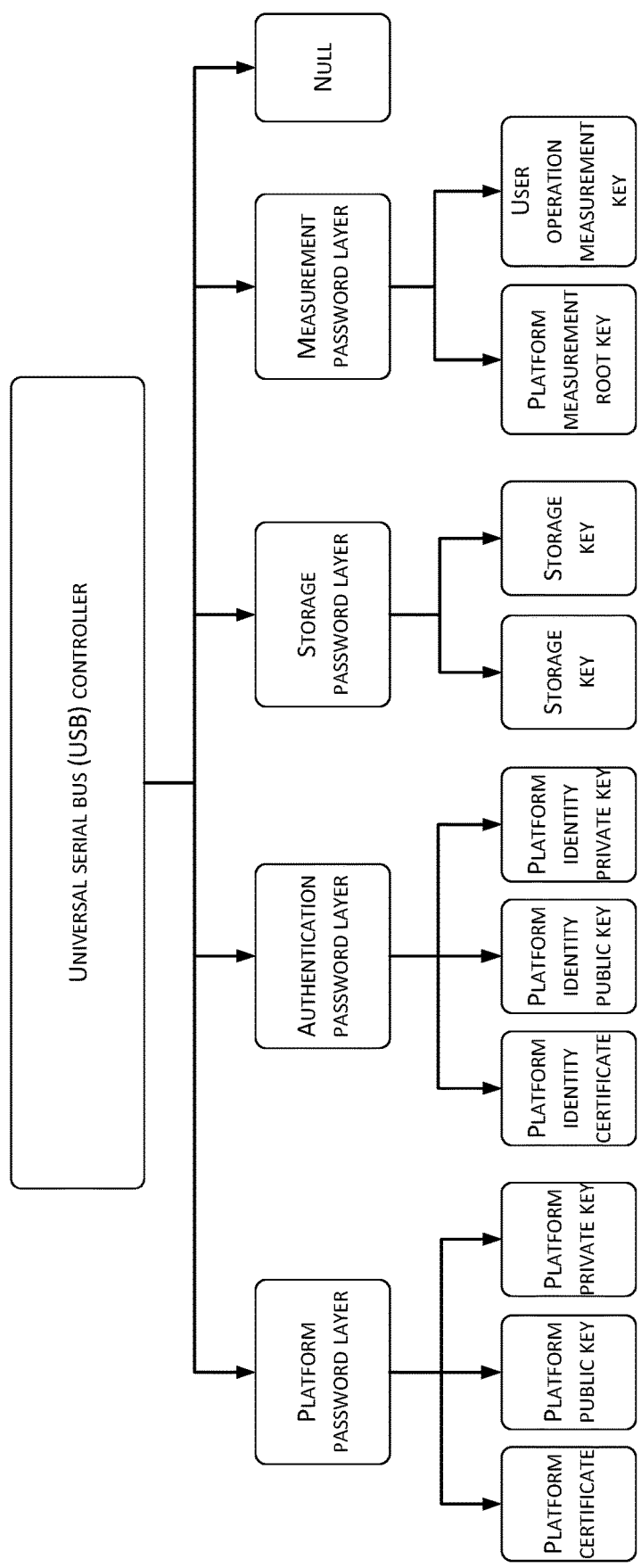
FIG. 4 shows a schematic diagram of a key hierarchical structure of a trusted high-speed data encryption card.

For example, in a schematic diagram of a key hierarchical structure 400 of a trusted high-speed data encryption card as shown in FIG. 4, a KMS (Key Management Service) of the THSDEC is divided into a platform cryptographic layer, an authentication cryptographic layer, a storage cryptographic layer, and a measurement cryptographic layer. The platform cryptographic layer includes a platform certificate, a platform public key, and a platform private key. The authentication cryptographic layer includes a platform identity certificate, a platform identity public key, and a platform identity private key. The storage cryptographic layer includes a storage key. The measurement cryptographic layer includes a platform measurement root key (i.e., a platform measurement key) and a user operation measurement key (i.e., a user measurement key), i.e., the measurement key.

The trusted high-speed data encryption card (THSDEC) uses a structure of four persistent key layers to support different instances, as shown in FIG. 4. They have separate access authorization controls (authorization passwords and policies), separate administrators, and slightly different methods of operations: a platform cryptographic layer structure (i.e., the platform password storage structure), a storage cryptographic layer structure (Storage Hierarchy) (i.e., the storage password storage structure), an authentication cryptographic layer structure (Endorsement Hierarchy) (i.e., the authentication password storage structure), and a measurement key cryptographic layer structure (i.e., the measurement password storage structure). In addition, a null cryptographic layer structure (Null Hierarchy) is different from the persistent key layers, with an authorization key being null and a policy being also null, which is cleared after a restart.

An authorization handle (which identifies an identifier of an object or item) access control:

A handle of the platform cryptographic layer structure (TPM_RH_Platform) is provided to platform OEM manufacturers for use, and is usually allocated by BIOS and not visible upwards. The platform cryptographic layer includes a platform certificate and a platform public-private key pair, with a platform having a unique pair of platform public-private pairs. The platform certificate contains information about TPM/TPCM attributes, such as TPM_id||HSDEC_id, TPM-HSDEC_Public-key, etc., and a format thereof conforms to the X.509 certificate standard.

A handle of the storage cryptographic layer structure (TPM_RH_OWNER) and an authorization key (owner password) are provided to a platform owner, an IT operation and maintenance department, or a service party. The storage cryptographic layer structure is used by the service party. Different service parties can create respective master keys of their own (SRK, storage root key), also called a primary storage key, at this layer, which are used for protecting respective service keys.

A handle of the authentication cryptographic layer structure (TPM_RH_ENDORSEMENT) and an authorization key (endorse password) are mainly used for platform authentication. The authentication cryptographic layer includes a platform identity certificate and a platform identity public-private pair. A platform has multiple pairs of platform identity public-private pairs.

The measurement cryptographic layer includes a platform measurement key and a user operation measurement key (i.e., a user measurement key). The platform measurement key is used for participating in verifying the integrity of a platform and a system. The user measurement key is used for participating in verifying a user in a cryptographic operation process, and is used for verifying the integrity of a cryptographic operation related firmware that is loaded.

In implementations, a trusted computing system firmware is securely stored on the trusted computing chip, and the trusted computing system firmware is used for scheduling and executing trusted computing tasks, and performing an integrity verification of cryptographic operations. For example, as shown in FIG. 3, the storage area of the trusted computing chip includes a chip system firmware storage area. Components of a trusted computing product include a trusted computing chip, a trusted computing system firmware, a trusted computing support software, and an auxiliary tool. The trusted computing system firmware is actually an on-chip operating system of the trusted computing chip, and is specifically responsible for scheduling and execution of tasks such as active measurement control. Therefore, the chip system firmware storage area stores the trusted computing system firmware.

In implementations, the computing information includes a high-speed encryption operation firmware. The high-speed encryption operation firmware is used for scheduling and performing a data encryption task to encrypt data. The high-speed encryption operation firmware includes at least one second cryptographic algorithm. The second cryptographic algorithm is used for performing data encryption, and may specifically include any applicable algorithm, which is not limited in the embodiments of the present disclosure. The high-speed encryption operation firmware may also include interfaces, time sequences, state machines, caches, etc. The high-speed encryption operation firmware is securely stored on a trusted computing chip to improve the security of the firmware.

For example, as shown in FIG. 3, the storage area of the trusted computing chip includes an FPGA-cryptographic operation firmware storage area, i.e., the high-speed encryption operation firmware is securely stored in the storage area of the trusted computing chip. Before the high-speed encryption chip performs data encryption, the trusted computing chip provides the high-speed encryption operation firmware to the high-speed encryption chip for use in an encryption of data using the second cryptographic algorithm. The storage area of the trusted computing chip further includes a platform configuration register PCR (program control register). The PCR is a storage space in the trusted computing chip. Each PCR is a 256-bit area used for storing and updating hash results, and is a volatile storage, with content thereof being lost after power-off. A log (log) of the PCR stores an order of submission of measurement values. A trusted computing chip typically provides 27 or more PCRs which work with trusted reporting roots and trusted storage roots to implement platform identity authentication and integrity reporting. A PCR design needs to implement two basic functions. The first one is to ensure that the PCR can be reset to a default value, and the second one is to be capable of performing hashing after a measured firmware feature value is concatenated with an original value in the PCR, and then placing a result thereof back into the PCR, i.e., covering the hash result.

In implementations, the computing information includes a system secure operation firmware. The system secure operation firmware includes a firmware related to system-related secure operations, which may be transmitted from a flash (memory), and preferably obtained from the trusted computing chip. The firmware is then securely stored in a storage area of the high-speed encryption chip, being changed from a previous dynamic loading from the memory to a static storage, which reduces the time of loading from the outside. Furthermore, an existence of secure storage cannot be tampered with after the high-speed encryption chip, and thus the security is guaranteed.

Figure 5:
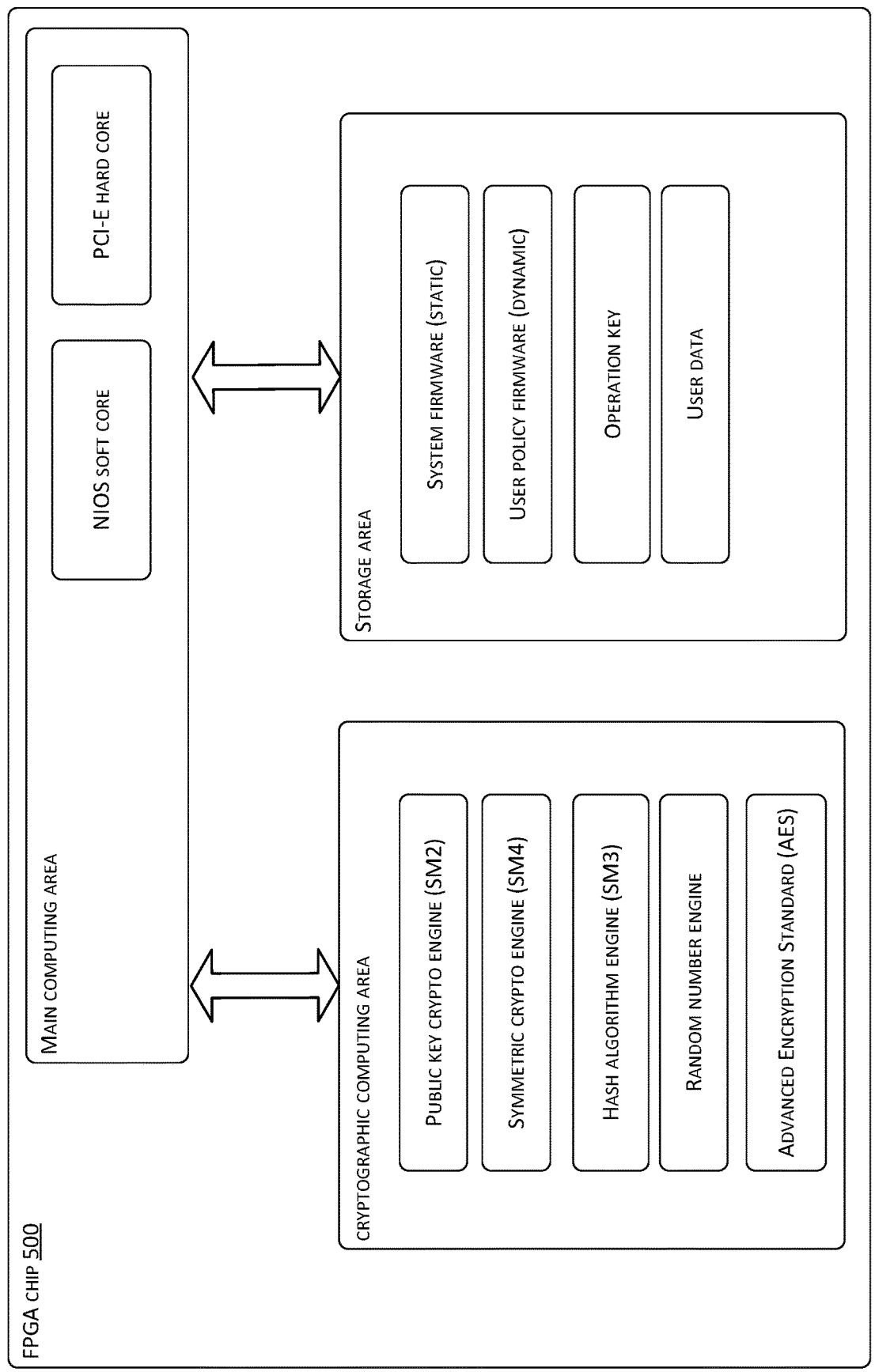
FIG. 5 shows a structural block diagram of an FPGA-based high-speed encryption chip.

For example, FIG. 5 shows a structural block diagram of a high-speed encryption chip 500 based on an FPGA (Field-Programmable Gate Array). FPGA is a high-performance, low-power programmable logic device, from which a circuit can be directly generated for performing computations of an algorithm. A targeted design can be made according to an algorithm and indicators of the algorithm, having a very high efficiency of execution and computation, and being suitable for online recognition systems that focus on an efficiency of execution. A FPGA-based high-speed encryption chip is mainly composed of a main computing area and a cryptographic operation area, i.e., a storage area. The main computing area is composed of a built-in FPGA chip NIOS soft core processor and a PCI-E hard core, which implement functions of a controller module and an interface module respectively. The storage area includes a system firmware static storage area, which is readable only and not writable. A system secure operation firmware is securely stored in that area.

In implementations of the present disclosure, in implementations, the computing information includes a user policy firmware. The user policy firmware is used for formulating cryptographic algorithm requirements of an application, which may be loaded from flash, and preferably obtained from the trusted computing chip and then stored in the high-speed encryption chip. If the high-speed encryption chip is reconfigurable, the user policy firmware can be modified according to the user's needs, this improving the flexibility of formulating the cryptographic algorithm requirements of the application.

For example, as shown in FIG. 5, the storage area of the FPGA-based high-speed encryption chip includes a user policy firmware dynamic storage area. The user policy firmware can be reconstructed according to user demand data. The cryptographic computing area is mainly responsible for cryptographic operations that require relatively high cryptographic computing power and storage capacity. A cryptographic algorithm thereof can be dynamically loaded from within a board according to cryptographic algorithm requirements of an actual application that are formulated by the user policy firmware of the user policy firmware dynamic storage area. Before being obtained from the cryptographic computing area of the trusted computing chip, the platform measurement key can verify its integrity and legitimacy, and loading is then performed.

In implementations, the high-speed encryption chip stores user data, which can be loaded from flash, and stored in an area near the high-speed encryption chip, improving security and reading speed. After the integrated chip obtains the user demand data, the user data stored on the high-speed encryption chip is reconstructed according to the user demand data because reconfigurability is supported by the high-speed encryption chip. For example, as shown in FIG. 5, the storage area of the FPGA-based high-speed encryption chip includes a user data storage area used for storing user data. Since FPGA supports reconfigurability, the user data can be updated as needed.

In implementations, the trusted computing includes high-speed computing and low-speed computing. Operations platform security and/or system security that have a low requirement for an operation speed are recorded as low-speed operations. Correspondingly, operations that have a high requirement for an operation speed are recorded as high-speed operations. Specifically, the trusted computing can be classified into any applicable high-speed computing and low-speed computing according to actual requirements, which is not limited by the embodiments of the present disclosure.

Figure 6:
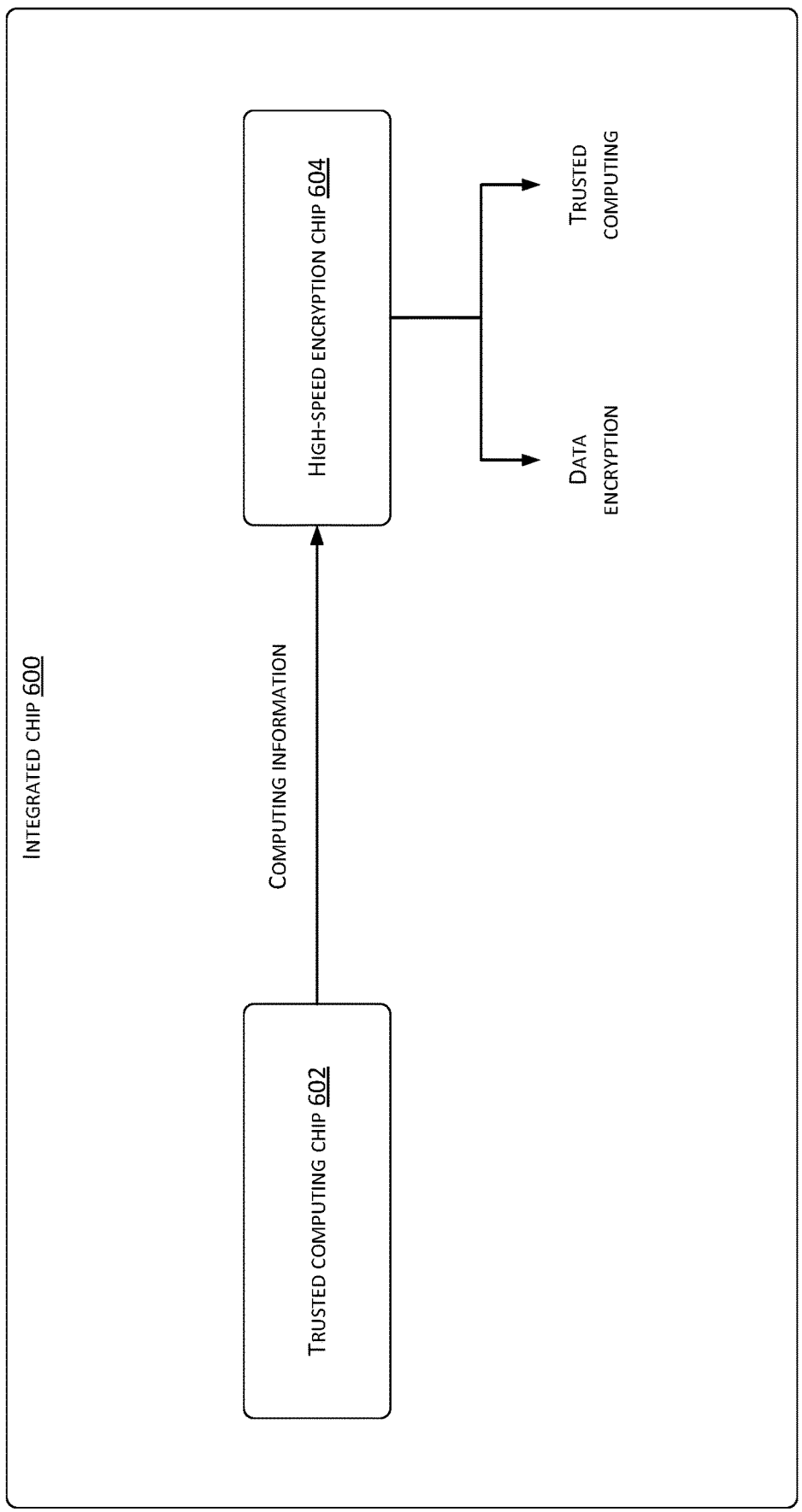
FIG. 6 shows a schematic diagram of a process of data processing based on an integrated chip.

According to an embodiment of the present disclosure, the trusted computing chip and the high-speed encryption chip each have a set of key systems, and the hardware cost and management cost of key management are high. In a schematic diagram of a process of data processing based on an integrated chip 600 as shown in FIG. 6, the present disclosure provides a data processing mechanism based on an integrated chip. The process can be applied in a process of trusted computing and data encryption that is based on an integrated chip. By providing computing information of a trusted computing chip 602 to a high-speed encryption chip 604, and calling the high-speed encryption chip to perform data encryption or trusted computing based on the computing information, these two types of secure computing (the trusted computing and data encryption) can share common computing information after these two chips are integrated together. Corresponding hardware and management costs are reduced as compared to using individual sets of computing information before integration. Furthermore, for data encryption functions, the trusted computing chip is better than the high-speed encryption chip in terms of functional integrity and reliability. Storing the computing information by the trusted computing chip can improve the security of the data encryption. For trusted computing functions, the utilization of the computing power of the high-speed encryption chip is increased, and the computational efficiency of the trusted computing is improved. The present disclosure is applicable to, but not limited to, the above application scenarios.

Figure 7:
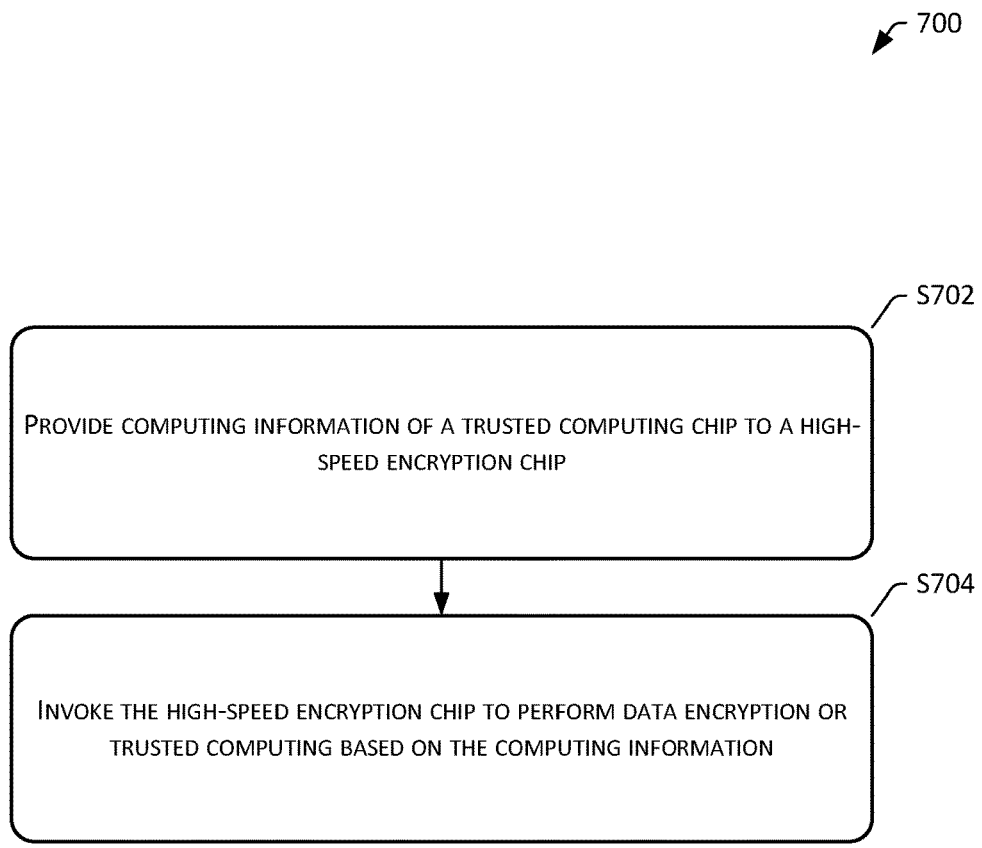
FIG. 7 shows a flowchart of an embodiment of a data processing method based on an integrated chip according to a first embodiment of the present disclosure.

Referring to FIG. 7, a flowchart of an embodiment of an integrated-chip-based data processing method 700 according to the first embodiment of the present disclosure is shown. The method 700 may specifically include the following operations.

S702: Provide computing information of a trusted computing chip to a high-speed encryption chip.

In the embodiments of the present disclosure, the trusted computing chip and the high-speed encryption chip are integrated into an integrated chip, so that the trusted computing chip and the high-speed encryption chip share the same set of key systems (including key information and cryptographic operation information), and do not need to have individual sets of key systems. The computing information is stored on the trusted computing chip, and is provided to the high-speed encryption chip when needed by the high-speed encryption chip.

A method of providing the high-speed encryption chip can be implemented through data interactions in the integrated chip, for example, through direct communications using a circuit inside the integrated chip, and may specifically include any applicable manner, which is not limited by the embodiments of the present disclosure.

In the embodiments of the present disclosure, providing the computing information of the trusted computing chip to the high-speed encryption chip may be performed when the integrated chip is started, or before data encryption or the trusted computing is performed using the high-speed encryption chip, which is not limited by the embodiments of the present disclosure.

S704: Invoke the high-speed encryption chip to perform data encryption or trusted computing based on the computing information.

In the embodiments of the present disclosure, the trusted computing chip can perform trusted computing, and the high-speed encryption chip can perform data encryption originally. For data encryption or trusted computing to be completed by the integrated chip, after the high-speed encryption chip obtains the computing information, the high-speed encryption chip can be invoked to perform data encryption. Since the computing information is obtained from the trusted encryption chip, the security of the data encryption is improved. Trusted computing can be performed on the trusted computing chip or can be performed by invoking the high-speed encryption chip. Specifically, some of the trusted computing can be placed and performed on a trusted computing chip, and some of the trusted computing can be performed on the high-speed encryption chip. Alternatively, all of the trusted computing is placed and performed on the high-speed encryption chip to improve the computational efficiency of the trusted computing. Apparently, since the computing information can be shared by the trusted computing chip and the high-speed encryption chip, this leads to a reduction in corresponding hardware and management costs for the integrated chip.

According to the embodiments of the present disclosure, by providing computing information of a trusted computing chip to a high-speed encryption chip, the high-speed encryption chip is invoked to perform data encryption or trusted computing based on the computing information. As such, after these two types of chips are integrated, these two types of secure computing (the trusted computing and the data encryption) can share common computing information.

Compared with using individual sets of computing information before integration, corresponding hardware and management costs are reduced. Moreover, the trusted computing chip is superior to the high-speed encryption chip in terms of functional integrity and reliability for data encryption functions. Storing the computing information by the trusted computing chip can improve the security of the data encryption. For trusted computing functions, the utilization of the computing power of the high-speed encryption chip is increased, and the computational efficiency of the trusted computing is improved.

In implementations, the trusted computing system firmware is securely stored on the trusted computing chip. An implementation of the trusted computing may include to scheduling and executing a trusted computing task using the trusted computing system firmware to perform an integrity check on a cryptographic operation.

Trusted computing tasks are targeted at the integrated chip. The trusted computing system firmware operates in the trusted computing chip, being able to schedule and execute trusted computing tasks, and perform integrity checks on cryptographic operations. Specifically, the trusted computing chip needs to be dispatched to perform trusted computing that needs to be performed by the trusted computing chip. Apparently, the trusted computing tasks can also be sent to the high-speed encryption chip, which is not limited in the embodiments of the present disclosure.

In implementations, the trusted computing includes high-speed computing and low-speed computing. An implementation of the trusted computing may include invoking the trusted computing chip to perform low-speed computing for platform security and/or system security, and/or invoking the high-speed encryption chip to perform high-speed computing.

A pre-integration system cannot separate high-speed computing and low-speed computing, which are both performed by a trusted computing chip. Because of the fast computing speed and high storage capacity of a high-speed encryption chip, high-speed computing with high speed requirements can be placed and performed in the high-speed encryption chip, and low-speed computing with high security requirements and low speed requirements can be placed and performed in the trusted computing chip, thus providing computational efficiency and computational security as a whole.

Figure 8:
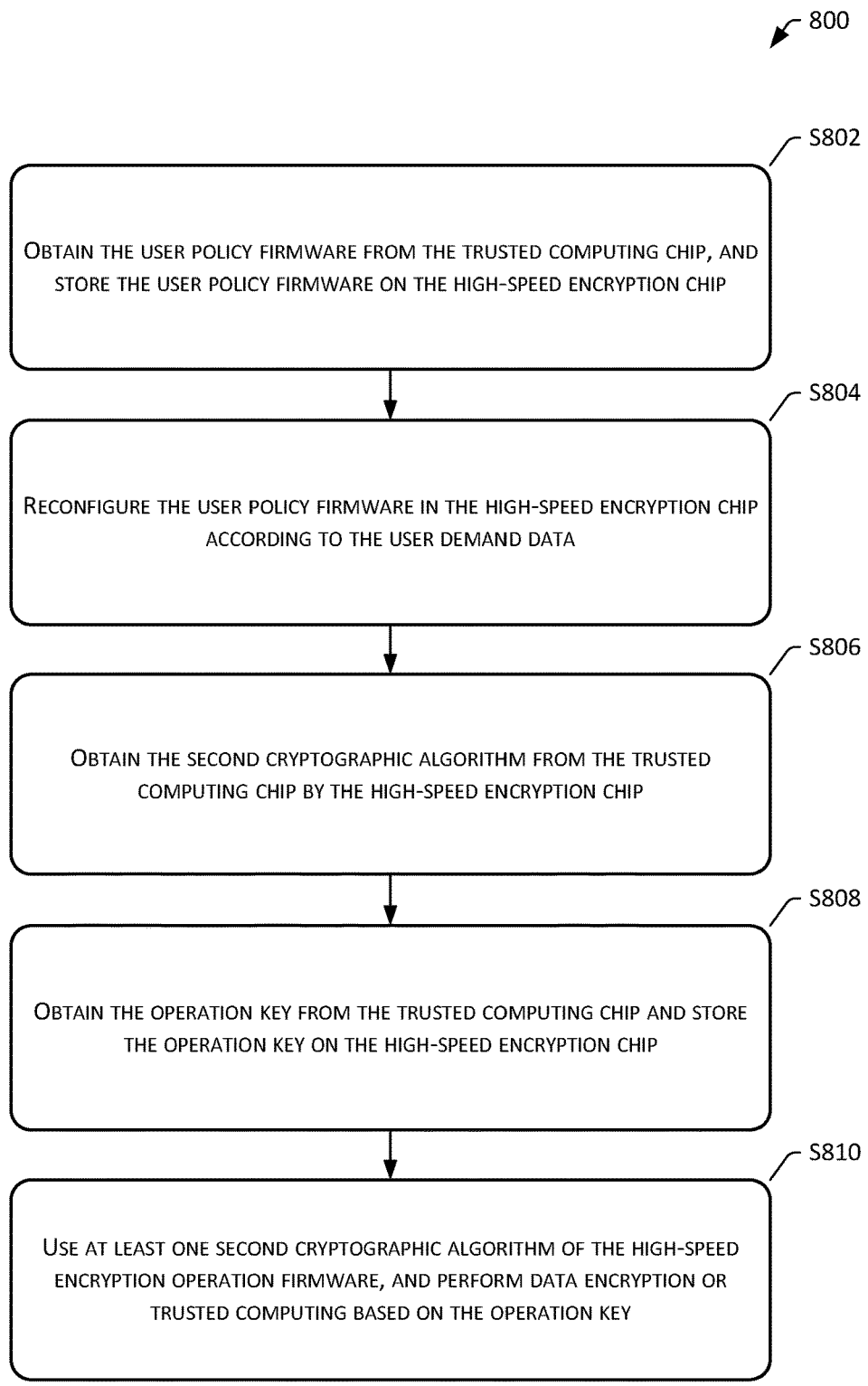
FIG. 8 shows a flowchart of an embodiment of an integrated-chip-based data processing method according to a second embodiment of the present disclosure.

FIG. 8 is a flowchart of an embodiment of an integrated-chip-based data processing method 800 according to the second embodiment of the present disclosure. The method may specifically include the following operations.

S802: Obtain the user policy firmware from the trusted computing chip, and store the user policy firmware on the high-speed encryption chip.

In the embodiments of the present disclosure, the computing information includes the user policy firmware. The high-speed encryption chip obtains the user policy firmware from the trusted computing chip and stores the user policy firmware in the high-speed encryption chip.

S804: Reconfigure the user policy firmware in the high-speed encryption chip according to the user demand data.

In the embodiments of the present disclosure, the user policy firmware on the high-speed encryption chip is reconstructed according to the user demand data, so as to formulate cryptographic algorithm requirements of an actual application according to reconstructed user policy data, perform loading within a board, and load the cryptographic algorithm to the high-speed encryption chip.

S806: Obtain the second cryptographic algorithm from the trusted computing chip by the high-speed encryption chip.

In the embodiments of the present disclosure, the high-speed encryption chip also needs to obtain the second cryptographic algorithm from the trusted computing chip, and a high-speed encryption operation firmware is securely stored on the trusted computing chip. Specifically, the high-speed encryption operation firmware can be loaded into the high-speed encryption chip, from which the second cryptographic algorithm is obtained. Alternatively, the second cryptographic algorithm can be obtained directly from the trusted computing chip. The embodiments of the present disclosure do not have any limitations thereon.

S808: Obtain the operation key from the trusted computing chip and store the operation key on the high-speed encryption chip.

In the embodiments of the present disclosure, the high-speed encryption chip also needs to obtain the operation key from the trusted computing chip and store the operation key on the high-speed encryption chip.

S810: Use at least one second cryptographic algorithm of the high-speed encryption operation firmware, and perform data encryption or trusted computing based on the operation key.

In the embodiments of the present disclosure, when the high-speed encryption chip performs data encryption or trusted computing, in an implementation, at least one second cryptographic algorithm of the high-speed encryption operation firmware may be adopted, and the data encryption or the trusted computing is performed based on the operation key obtained from the trusted computing chip.

In implementations, an implementation of providing the computing information of the trusted computing chip to the high-speed encryption chip may include obtaining the master key from the trusted computing chip by the high-speed encryption chip. The data encryption may then include encrypting the user application key based on the obtained master key.

In implementations, an implementation of providing the computing information of the trusted computing chip to the high-speed encryption chip may include obtaining a system secure operation firmware and securely storing the system secure operation firmware on the high-speed encryption chip. The trusted computing can then include performing a secure operation on the system on the high-speed encryption chip. The trusted computing includes secure operations on the system. In order to improve security and computational efficiency, secure storage of the system secure operation firmware is performed after being obtained from the trusted computing chip, so that the system secure operation firmware on the high-speed encryption chip cannot be tampered with. Furthermore, the computing power of the high-speed encryption chip is used for secure computing.

According to the embodiments of the present disclosure, the user policy firmware is obtained from the trusted computing chip, and stored on the high-speed encryption chip. The user policy firmware on the high-speed encryption chip is reconstructed according to user demand data. The high-speed encryption chip obtains the second cryptographic algorithm from the trusted computing chip, obtains the operation key from the trusted computing chip, and stores thereof on the high-speed encryption chip. Data encryption or trusted computing is performed using at least one second cryptographic algorithm of the high-speed encryption firmware based on the operation key. As such, after the two chips are integrated, these two types of secure computing (trusted computing and data encryption) can share common computing information. As compared to individual sets of computing information before integration, corresponding hardware and management costs are reduced. Moreover, for data encryption functions, the trusted computing chip superior to the high-speed encryption chip in terms of functional integrity and reliability. Storing the computing information by the trusted computing chip can improve the security of data encryption. For trusted computing functions, the utilization of the computing power of the high-speed encryption chip is increased, thus improving the computational efficiency of trusted computing.

Figure 9:
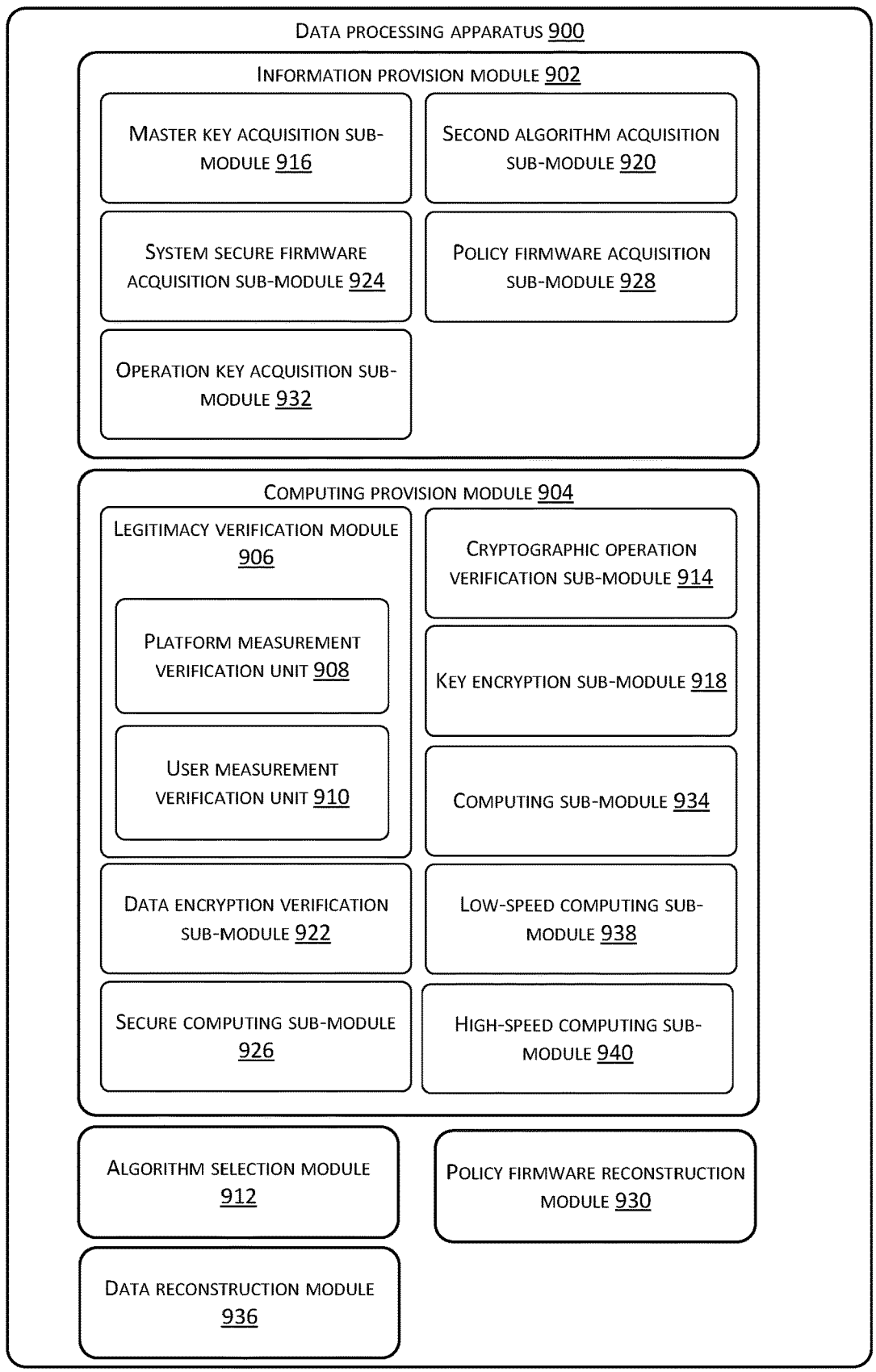
FIG. 9 shows a structural block diagram of an embodiment of an integrated-chip-based data processing apparatus according to a third embodiment of the present disclosure.

FIG. 9 is a structural block diagram of an embodiment of an integrated-chip-based data processing apparatus 900 according to the third embodiment of the present disclosure. The integrated chip includes a trusted computing chip and a high-speed encryption chip, and may specifically include an information provision module 902 configured to provide computing information of the trusted computing chip to the high-speed encryption chip, wherein the computing information includes key information and cryptographic operation information of trusted computing and data encryption; and a computing module 904 configured to invoke the high-speed encryption chip to perform data encryption or trusted computing based on the computing information.

In implementations, the trusted computing chip and the high-speed encryption chip perform data communications based on a circuit.

In implementations, the computing information includes a measurement key, and the computing module 904 includes a legitimacy verification module 906 configured to verify an integrity of a target algorithm and/or a legitimacy of an execution object of the algorithm based on the measurement key.

In implementations, the measurement key includes a platform measurement key, and the legitimacy verification module 906 includes a platform measurement verification unit 908 configured to verify an integrity of an integrity measurement code and the legitimacy of the execution object of the algorithm based on the platform measurement key before performing integrity measurements on a system or a platform.

In implementations, the measurement key includes a user measurement key, and the legitimacy verification module 906 includes a user measurement verification unit 910 configured to verify an integrity of an operation algorithm of a user cryptographic operation according to the user measurement key before performing the user cryptographic operation.

In implementations, the trusted computing chip securely stores at least one first cryptographic algorithm, and the apparatus 900 further includes an algorithm selection module 912 configured to select at least one first cryptographic algorithm that matches a current mode of the integrated chip.

In implementations, the trusted computing chip securely stores a trusted computing system firmware, and the computing module 904 includes a cryptographic operation verification sub-module 914 configured to schedule and execute a trusted computing task using the trusted computing system firmware to perform an integrity verification on a cryptographic operation.

In implementations, the computing information includes at least one master key for a user application key, and the master key is securely stored on the trusted computing chip, the master key being used to protect the user application key.

The information provision module 902 includes a master key acquisition sub-module 916 configured to obtain the master key from the trusted computing chip for the high-speed encryption chip.

The computing module 904 includes a key encryption sub-module 918 configured to perform encryption processing on the user application key based on the obtained master key.

In implementations, the computing information includes a high-speed encryption operation firmware, the high-speed encryption operation firmware being securely stored on the trusted computing chip, and the high-speed encryption operation firmware including at least one second cryptographic algorithm.

The information provision module 902 includes a second algorithm acquisition sub-module 920 configured to obtain the second cryptographic algorithm from the trusted computing chip for the high-speed encryption chip.

The computing module 904 includes a data encryption sub-module 922 configured to perform data encryption using at least one second cryptographic algorithm of the high-speed encryption operation firmware.

In implementations, the computing information includes a system secure operation firmware, and the information provision module 902 includes a system secure firmware acquisition sub-module 924 configured to obtain the system secure operation firmware from the trusted computing chip, and securely store the firmware on the high-speed encryption chip.

The computing module 904 includes a secure computing sub-module 926 configured to perform a secure operation of a system on the high-speed encryption chip.

In implementations, the computing information includes a user policy firmware, and the user policy firmware is used to formulate cryptographic algorithm requirement(s) of an application. The information provision module 902 includes a policy firmware acquisition module 928 configured to obtain the user policy firmware from the trusted computing chip, and store the firmware on the high-speed encryption chip.

The apparatus 900 further includes a policy firmware reconstruction module 930 configured to reconstruct the user policy firmware on the high-speed encryption chip according to user demand data.

In implementations, the computing information includes an operation key, the operation key being used for protecting user data. The information provision module 902 includes an operation key acquisition module 932 configured to obtain the operation key from the trusted computing chip, and store the operation key on the high-speed encryption chip.

The computing module 904 includes a computing sub-module 934 configured to perform data encryption or trusted computing based on the operation key.

In implementations, the high-speed encryption chip stores user data, and the apparatus 900 further includes a data reconstruction module 936 configured to reconstruct the user data on the high-speed encryption chip according to user demand data.

In implementations, the trusted computing includes a high-speed computing and a low-speed computing, and the computing module 904 includes a low-speed computing sub-module 938 configured to invoke the trusted computing chip to perform the low-speed computing for platform security and/or system security; and/or a high-speed computing sub-module 940 configured to invoke the high-speed encryption chip to perform the high-speed computing.

In implementations, the key information includes a platform certificate, a platform public key, a platform private key, a platform identity certificate, a platform identity public key, a platform identity private key, a storage key, and a platform measurement key, a user measurement key, a master key, and an operation key.

In implementations, the integrated chip includes a platform password storage structure, an authentication password storage structure, a storage password storage structure, and a measurement password storage structure, in which the key information is stored. The platform password storage structure includes a platform certificate, a platform public key, and a platform private key. The authentication password storage structure includes a platform identity certificate, a platform identity public key, and a platform identity private key. The storage password storage structure includes a storage key. The measurement password storage structure includes a platform measurement key and a user measurement key.

In implementations, the user measurement key is stored in a non-volatile storage space of the trusted computing chip, or a static storage area of the high-speed encryption chip. The master key is stored in the non-volatile storage space of the trusted computing chip, or is stored in a storage space outside the integrated chip after being encrypted by the storage key. The operation key is stored in the non-volatile storage space of the trusted computing chip, or the static storage area of the high-speed encryption chip, or the storage space outside the integrated chip after being encrypted by the master key.

According to the embodiments of the present disclosure, by providing computing information of a trusted computing chip to a high-speed encryption chip, the high-speed encryption chip is invoked to perform data encryption or trusted computing based on the computing information. As such, after these two types of chips are integrated, these two types of secure computing (the trusted computing and the data encryption) can share common computing information. Compared with using individual sets of computing information before integration, corresponding hardware and management costs are reduced. Moreover, the trusted computing chip is superior to the high-speed encryption chip in terms of functional integrity and reliability for data encryption functions. Storing the computing information by the trusted computing chip can improve the security of the data encryption. For trusted computing functions, the utilization of the computing power of the high-speed encryption chip is increased, and the computational efficiency of the trusted computing is improved.

Due to their basically similarities to the method embodiments, the description of the apparatus embodiments is relatively simple, and references can be made to relevant portions of the description of the method embodiments.

Figure 10:
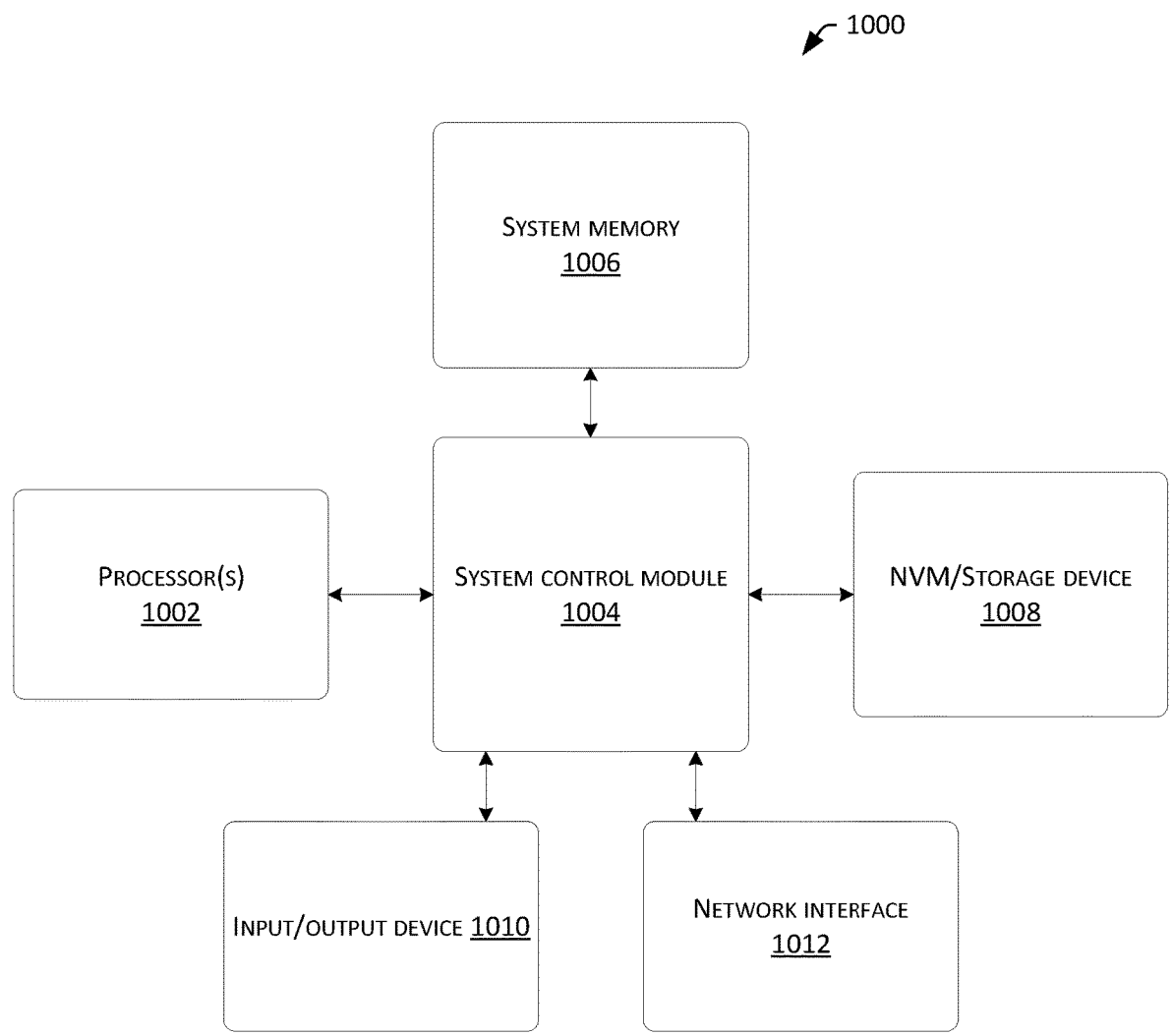
FIG. 10 shows an exemplary system that can be utilized to implement various embodiments described in the present disclosure.

The embodiments of the present disclosure can be implemented as a system having a desired configuration using any suitable hardware, firmware, software, or any combination thereof. FIG. 10 schematically illustrates an exemplary system (or apparatus) 1000 that can be used to implement various embodiments described in the present disclosure.

In one embodiment, FIG. 10 illustrates an exemplary system 1000. The system includes one or more processors 1002, a system control module (chipset) 1004 coupled to at least one of the processor(s) 1002, a system memory 1006 coupled to the system control module 1004, a non-volatile memory (NVM)/storage device 1008 coupled to the system control module 1004, and one or more input/output devices 1010 coupled to the system control module 1004, and a network interface 1012 coupled to the system control module 1006.

The processor 1002 may include one or more single-core or multi-core processors. The processor 1002 may include any combination of general purpose or special purpose processors (e.g., graphics processors, application processors, baseband processors, etc.). In some embodiments, the system 1000 may function as a data processing apparatus as described in the embodiments of the present disclosure.

In some embodiments, the system 1000 can include one or more computer readable media (e.g., the system memory 1006 or the NVM/storage device 1008) having instructions, and one or more processors 1002 that are configured to execute the instructions in conjunction with the one or more computer readable media to implement the modules and thereby perform the actions described in the present disclosure.

In implementations, the system control module 1004 may include any suitable interface controller to provide any suitable interface to at least one of the processor(s) 1002 and/or any suitable device or component that is in communication with the system control module 1004.

The system control module 1004 may include a memory controller module to provide an interface to the system memory 1006. The memory controller module may be a hardware module, a software module, and/or a firmware module.

The system memory 1006 may be configured to load and store data and/or instructions for the system 1000, for example. In implementations, the system memory 1006 may include any suitable volatile memory, such as a suitable DRAM. In some embodiments, the system memory 1006 may include a double data rate type four synchronous dynamic random access memory (DDR4 SDRAM).

In embodiments, the memory 1006 described in the foregoing description may include a form of computer storage media such as a volatile memory, a random access memory (RAM) and/or a non-volatile memory, for example, a read-only memory (ROM) or a flash RAM. The memory 1006 is an example of a computer storage media.

The computer storage media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer storage media does not include transitory media, such as modulated data signals and carrier waves.

In implementations, the system control module 1004 may include one or more input/output controllers to provide an interface to the NVM/storage device 1008 and the input/output device(s) 1010.

For example, the NVM/storage device 1008 can be configured to store data and/or instructions. The NVM/storage device 1008 may include any suitable non-volatile memory (e.g., a flash memory) and/or may include any suitable non-volatile storage device(s) (e.g., one or more hard disk drives (HDD), one or more compact disc (CD) drives and/or one or more digital versatile disc (DVD) drives).

The NVM/storage device 1008 can include a storage resource that is physically a part of a device on which the system 1000 is installed, or one that can be accessed by the device without having to be part of the device. For example, the NVM/storage device 1008 can be accessed through a network via the input/output device(s) 1010.

The input/output device(s) 1010 can provide an interface to the system 1000 to communicate with any other suitable device. The input/output device 1010 can include a communication component, an audio component, a sensor component, and the like. The network interface 1012 can provide an interface for the system 1000 to communicate over one or more networks. the system 1000 can conduct wireless communications with one or more components of a wireless network in accordance with any of one or more wireless network standards and/or protocols, for example, by accessing the wireless network based on a communication standard, such as WiFi, 2G or 3G, or a combination thereof for conducting wireless communications.

In implementations, at least one of the processor(s) 1002 can be packaged with logics of one or more controllers (e.g., memory controller modules) of the system control module 1004. In implementations, at least one of the processor(s) 1002 can be packaged with the logics of one or more controllers of the system control module 1004 to form a system in package (SiP). In implementations, at least one of the processor(s) 1002 can be integrated into a same mold with the logics of one or more controllers of the system control module 1004. In implementations, at least one of the processor(s) 1002 can be integrated with the logics of one or more controllers of the system control module 1004 on a same mold to form a system on a chip (SoC).

In various embodiments, the system 1000 can be, but is not limited to, a browser, a workstation, a desktop computing device, or a mobile computing device (e.g., a laptop computing device, a handheld computing device, a tablet, a netbook, etc.). In various embodiments, the system 1000 can have more or fewer components and/or different architectures. For example, in some embodiments, the system 1000 includes one or more cameras, a keyboard, a liquid crystal display (LCD) screen (including a touch screen display), a non-volatile memory port, multiple antennas, a graphics chip, an application specific integrated circuit (ASIC), and speakers.

If the screen includes a touch panel, the screen can be implemented as a touch screen display to receive an input signal of a user. The touch panel includes one or more touch sensors to sense touches, slides, and gestures on the touch panel. The touch sensors may sense not only the boundary of a touching action or a sliding action, but also a time duration and pressure associated with a touching or sliding operation.

The embodiments of the present disclosure further provide a non-volatile readable storage media. The storage media stores one or more modules (programs). When the one or more modules are applied in a terminal device, the terminal device may be enabled to execute instructions of various method operations in the embodiments of the present disclosure.

In an example, a computing device is provided, which includes a memory, a processor, and a computer program that is stored in the memory and executable by the processor, wherein the processor, when executing the computer program, implements the method(s) of the embodiments of the present disclosure.

In an example, a computer readable storage media is also provided, which has a computer program stored thereon, wherein the program, when executed by a processor, implements one or more methods of the embodiments of the present disclosure.

The embodiments of the present disclosure disclose a data processing method and an apparatus thereof based on an integrated chip.

Example 1 includes an integrated-chip-based data processing method, wherein the integrated chip includes a trusted computing chip and a high-speed encryption chip, and the method includes providing computing information of the trusted computing chip to the high-speed encryption chip, wherein the computing information includes key information and cryptographic operation information of trusted computing and data encryption; and invoking the high-speed encryption chip to perform the data encryption or the trusted computing based on the computing information.

Example 2 may include the method of example 1, wherein the trusted computing chip and the high-speed encryption chip perform data communications based on a circuit.

Example 3 may include the method of example 1 and/or example 2, wherein the computing information includes a measurement key, invoking the high-speed encryption chip to perform the trusted computing including verifying an integrity of a target algorithm and/or a legitimacy of an execution object of the algorithm based on the measurement key.

Example 4 may include the method of one or more of Example 1-Example 3, wherein the measurement key includes a platform measurement key, and verifying the integrity of the target algorithm and/or the legitimacy of the execution object of the algorithm based on the measurement key includes verifying an integrity of an integrity measurement code and the legitimacy of the execution object of the algorithm based on the platform measurement key prior to performing an integrity measurement on a system or platform.

Example 5 may include the method of one or more of Examples 1-4, wherein the measurement key includes a user measurement key, verifying the integrity of the target algorithm and/or the legitimacy of the execution object of the algorithm based on the measurement key includes verifying an integrity of an algorithm of a user cryptographic operation based on the user measurement key prior to performing the user cryptographic operation.

Example 6 may include the method of one or more of the examples 1-5, wherein the trusted computing chip is configured to securely store at least one first cryptographic algorithm, and the method further includes selecting at least one first cryptographic algorithm that matches a current mode of the integrated chip.

Example 7 may include the method of one or more of Example 1-Example 6, wherein the trusted computing chip is configured to securely store a trusted computing system firmware, and invoking the high-speed encryption chip to perform the trusted computing includes scheduling and executing a trusted computing task using the trusted computing system firmware to perform an integrity check on a cryptographic operation.

Example 8 may include the method of one or more of Example 1-Example 7, wherein the computing information includes at least one master key for a user application key, the master key being securely stored in the trusted computing chip, and used for protecting the user application key; providing the computing information of the trusted computing chip to the high-speed encryption chip includes obtaining the master key from the trusted computing chip by the high-speed encryption chip; and invoking the high-speed encryption chip to perform the data encryption includes encrypting the user application key based on the obtained master key.

Example 9 may include the method of one or more of Example 1-Example 8, wherein the computing information includes a high-speed encryption operation firmware, the high-speed encryption operation firmware being securely stored on a trusted computing chip and including at least one second cryptographic algorithm; providing the computing information of the trusted computing chip to the high-speed encryption chip includes obtaining the second cryptographic algorithm from the trusted computing chip by the high-speed encryption chip; and invoking the high-speed encryption chip to perform the data encryption includes performing the data encryption using the at least one second cryptographic algorithm of the high-speed encryption operation firmware.

Example 10 may include the method of one or more of Example 1-Example 9, wherein the computing information includes a system secure operation firmware; providing the computing information of the trusted computing chip to the high-speed encryption chip includes obtaining the system secure operation firmware from the trusted computing chip, and securely storing the firmware on the high-speed encryption chip; and invoking the high-speed encryption chip to perform the trusted computing includes performing a secure operation of a system on the high-speed encryption chip.

Example 11 may include the method of one or more of Example 1-Example 10, wherein the computing information includes a user policy firmware, the user policy firmware being used for formulating cryptographic algorithm requirement(s) for an application; providing the computing information of the trusted computing chip to the high-speed encryption chip includes obtaining the user policy firmware from the trusted computing chip and storing the firmware on the high-speed encryption chip; and the method further includes reconstructing the user policy firmware on the high-speed encryption chip according to user demand data.

Example 12 may include the method of one or more of Example 1-Example 11, wherein the computing information includes an operation key; providing the computing information of the trusted computing chip to the high-speed encryption chip includes obtaining the operation key from the trusted computing chip and storing the operation key on the high-speed encryption chip; and invoking the high-speed encryption chip to perform the data encryption or trusted computing includes performing data encryption or trusted computing based on the operation key.

Example 13 may include the method of one or more of Example 1-Example 12, wherein the high-speed encryption chip stores user data, and the method further includes reconfiguring the user data on the high-speed encryption chip according to user demand data.

Example 14 may include the method of one or more of Example 1-Example 13, wherein the trusted computing includes a high-speed computing and a low-speed computing, and the trusted computing includes invoking the trusted computing chip to perform the low-speed computing for platform security and/or system security; and/or invoking the high-speed encryption chip to perform the high-speed computing.

Example 15 may include the method of one or more of Example 1-Example 14, wherein the key information includes a platform certificate, a platform public key, a platform private key, a platform identity certificate, a platform identity public key, a platform identity private key, a storage key, a platform measurement key, a user measurement key, a master key, and am operation key.

Example 16 may include the method of one or more of Example 1-Example 15, wherein the integrated chip includes a platform password storage structure, an authentication password storage structure, a storage password storage structure, and a measurement password storage structure, for storing the key information, wherein the platform password storage structure includes a platform certificate, a platform public key, and a platform private key; the authentication password storage structure includes a platform identity certificate, a platform identity public key, and a platform identity private key; the storage password storage structure includes a storage key; and the measurement password storage structure includes a platform measurement key and a user measurement key.

Example 17 may include the method of one or more of Example 1-Example 16, wherein the user measurement key is stored in a non-volatile storage space of the trusted computing chip, or a static storage area of the high-speed cryptographic chip; the master key is stored in the non-volatile storage space of the trusted computing chip or is stored in a storage space outside the integrated chip after being encrypted using the storage key; and the operation key is stored in the non-volatile storage space of the trusted computing chip, or the static storage area of the high-speed encryption chip, or the storage space outside the integrated chip after being encrypted using the master key.

Example 18 includes an integrated-chip-based data processing apparatus, the integrated chip including a trusted computing chip and a high-speed encryption chip, and the apparatus including an information provision module configured to provide computing information of the trusted computing chip to the high-speed encryption chip, wherein the computing information includes key information and cryptographic operation information of trusted computing and data encryption; and a computing module configured to invoke the high-speed encryption chip to perform the data encryption or the trusted computing based on the computing information.

Example 19 may include the apparatus of example 18, wherein the trusted computing chip and the high-speed encryption chip are based on circuitry for data communications.

Example 20 may include the apparatus of Example 18 and/or Example 19, wherein the computing information includes a measurement key, and the computing module includes a legitimacy verification module configured to verify an integrity of a target algorithm and/or a legitimacy of an execution object of the algorithm based on the measurement key.

Example 21 may include the apparatus of one or more of Example 18-Example 20, wherein the measurement key includes a platform measurement key, and the legitimacy verification module includes a platform measurement verification unit configured to verify an integrity of an integrity measurement code and the legitimacy of execution object of the algorithm based on the platform measurement key before performing an integrity measurement on a system or a platform.

Example 22 may include the apparatus of one or more of Example 18-Example 21, wherein the measurement key includes a user measurement key, and the legitimacy verification module includes a user measurement verification unit configured to verify an integrity of an operation algorithm of a user cryptographic operation based on the user measurement key before performing the user cryptographic operation.

Example 23 may include the apparatus of one or more of Example 18-Example 22, wherein the trusted computing chip is configured to securely store at least one first cryptographic algorithm, and the apparatus further includes an algorithm selection module configured to select at least one first cryptographic algorithm that matches a current mode of the integrated chip.

Example 24 may include the apparatus of one or more of Example 18-Example 23, wherein the trusted computing chip securely stores a trusted computing system firmware, and the computing module includes a cryptographic operation verification sub-module configured to schedule and execute a trusted computing task using the trusted computing system firmware to perform an integrity check on a cryptographic operation.

Example 25 may include the apparatus of one or more of Example 18-Example 24, wherein the computing information includes at least one master key for a user application key, the master key being securely stored in the trusted computing chip and used for protecting the user application key; the information provision module includes a master key acquisition sub-module configured to obtain the master key from the trusted computing chip by the high-speed encryption chip; and the computing module includes a key encryption sub-module configured to perform encryption processing on the user application key based on the obtained master key.

Example 26 may include the apparatus of one or more of Example 18-Example 25, wherein the computing information includes a high-speed encryption operation firmware, the high-speed encryption operation firmware being securely stored on the trusted computing chip and including at least one second cryptographic algorithm; the information provision module includes a second algorithm acquisition sub-module configured to obtain the second cryptographic algorithm from the trusted computing chip by the high-speed encryption chip; and the computing module includes a data encryption sub-module configured to perform data encryption using the at least one second cryptographic algorithm of the high-speed encryption operation firmware.

Example 27 may include the apparatus of one or more of Example 18-Example 26, wherein the computing information includes a system secure operation firmware; the information provision module includes a system security firmware acquisition sub-module configured to obtain the system secure operation firmware from the trusted computing chip, and securely store the firmware on the high-speed encryption chip; and the computing module includes a secure computing sub-module configured to perform a secure operation of a system on the high-speed encryption chip.

Example 28 may include the apparatus of one or more of Example 18-Example 27, wherein the computing information includes a user policy firmware, the user policy firmware being used to formulate cryptographic algorithm requirement(s) of an application; the information provision module includes a policy firmware acquisition module configured to obtain the user policy firmware from the trusted computing chip, and store the user policy firmware on the high-speed encryption chip; and the apparatus further includes a policy firmware reconstruction module configured to reconstruct the user policy firmware on the high-speed encryption chip according to user demand data.

Example 29 may include the apparatus of one or more of Example 18-Example 28, wherein the computing information includes an operation key; the information provision module includes an operation key acquisition module configured to obtain the operation key from the trusted computing chip, and store the operation key on the high-speed encryption chip; and the computing module includes a computing sub-module configured to perform data encryption or trusted computing based on the operation key.

Example 30 may include the apparatus of one or more of Example 18-Example 29, wherein the high-speed encryption chip stores user data, and the apparatus further includes a data reconstruction module configured to reconstruct the user data on the high-speed encryption chip according to user demand data.

Example 31 may include the apparatus of one or more of Example 18-Example 30, wherein the trusted computing includes high-speed computing and low-speed computing, and the computing module includes a low-speed computing sub-module configured to invoke the trusted computing chip to perform the low-speed computing for platform security and/or system security; and/or a high-speed computing sub-module configured to invoke the high-speed encryption chip to perform the high-speed computing.

Example 32 may include the apparatus of one or more of Example 18-Example 31, wherein the key information includes a platform certificate, a platform public key, a platform private key, a platform identity certificate, a platform identity public key, a platform identity private key, a storage key, a platform measurement key, a user measurement key, a master key, and an operation key.

Example 33 may include the apparatus of one or more of Example 18-Example 32, wherein the integrated chip includes a platform password storage structure, an authentication password storage structure, a storage password storage structure, and a measurement password storage structure that store the key information, wherein the platform password storage structure includes a platform certificate, a platform public key, and a platform private key; the authentication password storage structure includes a platform identity certificate, a platform identity public key, and a platform identity private key; the storage password storage structure includes a storage key; and the measurement password storage structure includes a platform measurement key and a user measurement key.

Example 34 may include the apparatus of one or more of Example 18-Example 33, wherein the user measurement key is stored in a non-volatile storage space of the trusted computing chip, or a static storage area of the high-speed cryptographic chip; the master key is stored in the non-volatile storage space of the trusted computing chip or is stored in a storage space outside the integrated chip after being encrypted using the storage key; the operation key is stored in the non-volatile storage space of the trusted computing chip, or the static storage area of the high-speed encryption chip, or the storage space outside the integrated chip after being encrypted using the master key.

Example 35: A computing device including a memory, a processor, and a computer program that is stored on the memory and operable on the processor, wherein the processor, when executing the computer program, implements the method of one or more of Examples 1-17.

Example 36: A computer readable storage media having stored thereon a computer program, wherein the program, when executed by a processor, implements the method of one or more of Examples 1-17.

Although certain embodiments have been shown and described for the purpose of illustration and description, various replacements and/or equivalents of the embodiments, or implementations that are obtained from calculations and achieve the same purposes of the embodiments that are shown and described do not depart from the scope of implementations of the present disclosure. The present disclosure is intended to cover any modifications or variations of the embodiments discussed herein. Therefore, it is apparent that the embodiments described herein are defined only by the claims and their equivalents.

What is claimed is:

1. A method implemented by an integrated chip comprising a trusted computing chip and a high-speed encryption chip, the method comprising:
   providing computing information of the trusted computing chip to the high-speed encryption chip, wherein the computing information includes key information, measurement keys, and cryptographic operation information of trusted computing and data encryption; and
   invoking the high-speed encryption chip to perform the data encryption and the trusted computing based on the computing information, wherein invoking the high-speed encryption chip to perform the trusted computing comprises verifying an integrity of a target algorithm and a legitimacy of an execution object of the target algorithm based on a respective measurement key of the measurement keys.

2. The method of claim 1, wherein the trusted computing chip and the high-speed encryption chip perform data communications based on a circuit.

3. The method of claim 1, wherein the measurement keys comprise a platform measurement key, and verifying the integrity of the target algorithm and the legitimacy of the execution object of the algorithm based on the respective measurement key of the measurement keys comprises verifying an integrity of an integrity measurement code and the legitimacy of the execution object of the target algorithm based on the platform measurement key prior to performing an integrity measurement on a system or platform.

4. The method of claim 1, wherein the measurement keys comprise a user measurement key, and verifying the integrity of the target algorithm and the legitimacy of the execution object of the target algorithm based on the respective measurement key of the measurement keys comprises verifying an integrity of an algorithm of a user cryptographic operation based on the user measurement key prior to performing the user cryptographic operation.

5. The method of claim 1, wherein the trusted computing chip is configured to securely store at least one first cryptographic algorithm, and the method further comprises selecting a first cryptographic algorithm that matches a current mode of the integrated chip.

6. The method of claim 1, wherein the trusted computing chip is configured to securely store a trusted computing system firmware, and invoking the high-speed encryption chip to perform the trusted computing further comprises scheduling and executing a trusted computing task using the trusted computing system firmware to perform an integrity check on a cryptographic operation.

7. The method of claim 1, wherein:
   the computing information further comprises at least one master key for a user application key, the master key being securely stored in the trusted computing chip, and used for protecting the user application key;
   providing the computing information of the trusted computing chip to the high-speed encryption chip comprises obtaining the master key from the trusted computing chip by the high-speed encryption chip; and
   invoking the high-speed encryption chip to perform the data encryption comprises encrypting the user application key based on the obtained master key.

8. The method of claim 1, wherein:
   the computing information further includes a high-speed encryption operation firmware, the high-speed encryption operation firmware being securely stored on the trusted computing chip and comprising at least one second cryptographic algorithm;
   providing the computing information of the trusted computing chip to the high-speed encryption chip comprises obtaining the at least one second cryptographic algorithm from the trusted computing chip by the high-speed encryption chip; and
   invoking the high-speed encryption chip to perform the data encryption includes performing the data encryption using the at least one second cryptographic algorithm of the high-speed encryption operation firmware.

9. The method of claim 1, wherein:
   the computing information further includes a system secure operation firmware;
   providing the computing information of the trusted computing chip to the high-speed encryption chip comprises obtaining the system secure operation firmware from the trusted computing chip, and securely storing the firmware on the high-speed encryption chip; and
   invoking the high-speed encryption chip to perform the trusted computing further comprises performing a secure operation of a system on the high-speed encryption chip.

10. The method of claim 1, wherein:
    the computing information further comprises a user policy firmware, the user policy firmware being used for formulating a cryptographic algorithm requirement for an application;
    providing the computing information of the trusted computing chip to the high-speed encryption chip comprises obtaining the user policy firmware from the trusted computing chip and storing the firmware on the high-speed encryption chip; and
    the method further comprises reconstructing the user policy firmware on the high-speed encryption chip according to user demand data.

11. The method of claim 1, wherein:
    the computing information further comprises an operation key;
    providing the computing information of the trusted computing chip to the high-speed encryption chip comprises obtaining the operation key from the trusted computing chip and storing the operation key on the high-speed encryption chip; and
    invoking the high-speed encryption chip to perform the data encryption or the trusted computing comprises performing the data encryption or the trusted computing based on the operation key.

12. The method of claim 1, wherein the high-speed encryption chip stores user data, and the method further comprises reconfiguring the user data on the high-speed encryption chip according to user demand data.

13. The method of claim 1, wherein the trusted computing comprises a high-speed computing and a low-speed computing, and the trusted computing comprises:

invoking the trusted computing chip to perform the low-speed computing for platform security and/or system security; and/or invoking the high-speed encryption chip to perform the high-speed computing.

14. The method of claim 1, wherein the key information comprises a platform certificate, a platform public key, a platform private key, a platform identity certificate, a platform identity public key, a platform identity private key, a storage key, a platform measurement key, a user measurement key, a master key, and am operation key.

15. The method of claim 14, wherein the integrated chip comprises a platform password storage structure, an authentication password storage structure, a storage password storage structure, and a measurement password storage structure, for storing the key information, wherein:

the platform password storage structure comprises the platform certificate, the platform public key, and the platform private key;

the authentication password storage structure comprises the platform identity certificate, the platform identity public key, and the platform identity private key;

the storage password storage structure comprises the storage key; and the measurement password storage structure comprises the platform measurement key and the user measurement key.

16. The method of claim 14, wherein:

the user measurement key is stored in a non-volatile storage space of the trusted computing chip, or a static storage area of the high-speed cryptographic chip;

the master key is stored in the non-volatile storage space of the trusted computing chip or is stored in a storage space outside the integrated chip after being encrypted using the storage key; and the operation key is stored in the non-volatile storage space of the trusted computing chip, or the static storage area of the high-speed encryption chip, or the storage space outside the integrated chip after being encrypted using the master key.

17. An apparatus comprising:
one or more processors;
memory;

an information provision module stored in the memory and executable by the one or more processors to provide computing information of a trusted computing chip of an integrated chip to a high-speed encryption chip of the integrated chip, wherein the computing information includes key information, measurement keys, and cryptographic operation information of trusted computing and data encryption; and a computing module stored in the memory and executable by the one or more processors to invoke the high-speed encryption chip to perform the data encryption and the trusted computing based on the computing information, wherein invoking the high-speed encryption chip to perform the trusted computing comprises verifying an integrity of a target algorithm and a legitimacy of an execution object of the target algorithm based on a respective measurement key of the measurement keys.

18. The apparatus of claim 17, wherein the trusted computing chip and the high-speed encryption chip are based on circuitry for data communications.

19. One or more non-transitory computer readable storage media storing executable instructions that, when executed by one or more processors, cause the one or more processors to perform acts comprising:

providing computing information of a trusted computing chip of an integrated chip to a high-speed encryption chip of the integrated chip, wherein the computing information includes key information, measurement keys, and cryptographic operation information of trusted computing and data encryption; and invoking the high-speed encryption chip to perform the data encryption and the trusted computing based on the computing information, wherein invoking the high-speed encryption chip to perform the trusted computing comprises verifying an integrity of a target algorithm and a legitimacy of an execution object of the target algorithm based on a respective measurement key of the measurement keys.

* * * * *